United States Patent
Kreuzer

(10) Patent No.: US 8,687,559 B2
(45) Date of Patent: Apr. 1, 2014

(54) FRAME MAPPING FOR GERAN VOICE CAPACITY ENHANCEMENTS

(75) Inventor: Werner Kreuzer, Baiem (DE)

(73) Assignee: BlackBerry Limited, Waterloo (CA)

( * ) Notice: Subject to any disclaimer, the term of this patent is extended or adjusted under 35 U.S.C. 154(b) by 77 days.

(21) Appl. No.: 13/388,930

(22) PCT Filed: Aug. 4, 2009

(86) PCT No.: PCT/EP2009/060124
§ 371 (c)(1),
(2), (4) Date: Feb. 3, 2012

(87) PCT Pub. No.: WO2011/015238
PCT Pub. Date: Feb. 10, 2011

(65) Prior Publication Data
US 2012/0182913 A1   Jul. 19, 2012

(51) Int. Cl.
*H04B 7/212* (2006.01)
(52) U.S. Cl.
USPC ............................ 370/328; 370/337; 370/347
(58) Field of Classification Search
USPC .................................. 370/328, 330, 337, 347
See application file for complete search history.

(56) References Cited

U.S. PATENT DOCUMENTS

2009/0323588 A1* 12/2009 Aghili et al. .................. 370/328
2010/0203854 A1*  8/2010 Yu et al. ..................... 455/127.1
2010/0322092 A1* 12/2010 Yu ................................ 370/252
2011/0205947 A1*  8/2011 Xin et al. ..................... 370/311
2012/0113878 A1*  5/2012 Yu et al. ....................... 370/311

OTHER PUBLICATIONS

European Patent Office, "Communication pursuant to Rules 161(1) and 162 EPC", issued for EP application serial No. 09781495.8, on Mar. 13, 2012, (2 pages).
Patent Cooperation Treaty, "International Search Report", issued for International application No. PCT/EP2009/060124, mailed on Oct. 4, 2010, (5 pages).
Patent Cooperation Treaty, "International Preliminary Report on Patentability", issued for International application No. PCT/EP2009/060124, completed on Nov. 15, 2011, (18 pages).
Patent Cooperation Treaty, "Written Opinion of the International Searching Authority", issued for International application No. PCT/EP2009/060124, completed on Nov. 15, 2011, (9 pages).
Huawei Technologies Co et al., "DTX performance of SACCH for VAMOS", 3GPP TSG GERAN #41, XP-002566226, Feb. 16-20, 2009, (5 pages)—Cited in "International Search Report", issued for International application No. PCT/EP2009/060124, mailed on Oct. 4, 2010.

(Continued)

*Primary Examiner* — Andrew Lee
(74) *Attorney, Agent, or Firm* — Hanley, Flight & Zimmerman LLC

(57) ABSTRACT

The present document relates to radio transmission. In particular, it relates to the mapping of frames in a GSM EDGE Radio Access Network (GERAN). A GERAN base station comprising a transceiver is described. The base station is operable to communicate with a first mobile station via a first VAMOS channel; to communicate with a second mobile station via a second corresponding VAMOS channel; and to use a control channel of the second VAMOS channel which is offset by 4 or 8 TDMA frames with respect to a control channel of the corresponding first VAMOS channel.

25 Claims, 14 Drawing Sheets

(56) References Cited

OTHER PUBLICATIONS

3GPP: "3GPP TS 45.001 V9.0.0 3rd Generation Partnership Project; Technical Sepcification Group GSM/EDGE Radio Access Network; Physical layer on the radio path; General description (Release 9)", May 1, 2009, (43 pages).—Cited in "International Search Report", issued for International application No. PCT/EP2009/060124, mailed on Oct. 4, 2010.

3GPP Change Request, 3GPP TSG-GERAN Meeting #42, GP-091047 (revision of GP-091034), 45.001 CR 0057, rev 2, version 8.0.0, Shenzhen, China, May 11-15, 2009, (6 pages).—Cited in "International Search Report", issued for International application No. PCT/EP2009/060124, mailed on Oct. 4, 2010.

International Searching Authority, "Invitation to Pay Additional Fees and Partial Search Report", issued for International application No. PCT/EP2009/060124, mailed on Jul. 21, 2010, (7 pages).

European Patent Office, "Communication Pursuant to Article 94(3) EPC," issued in connection with EP application No. EP09781495.8, on Apr. 17, 2013 (5 pages).

* cited by examiner

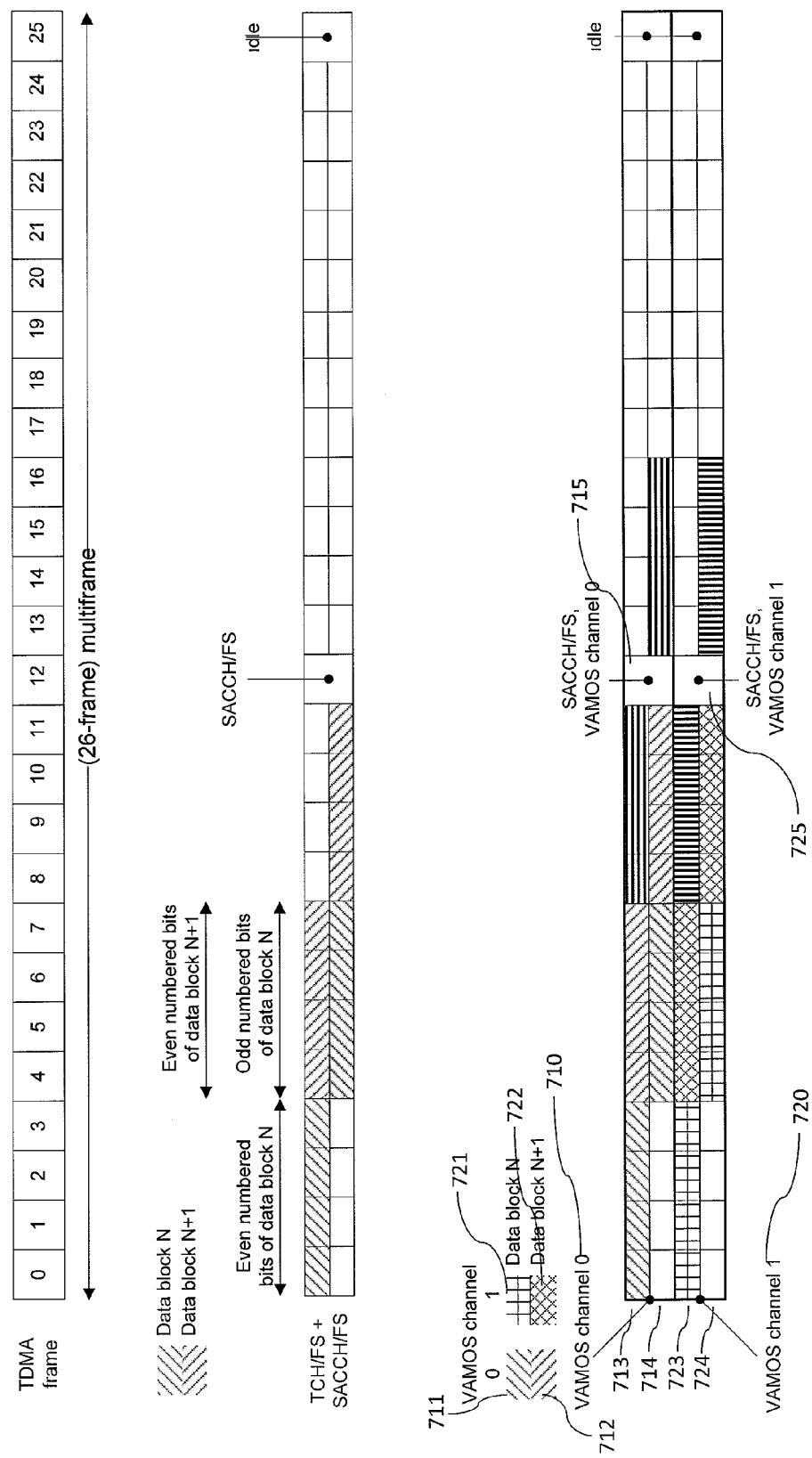

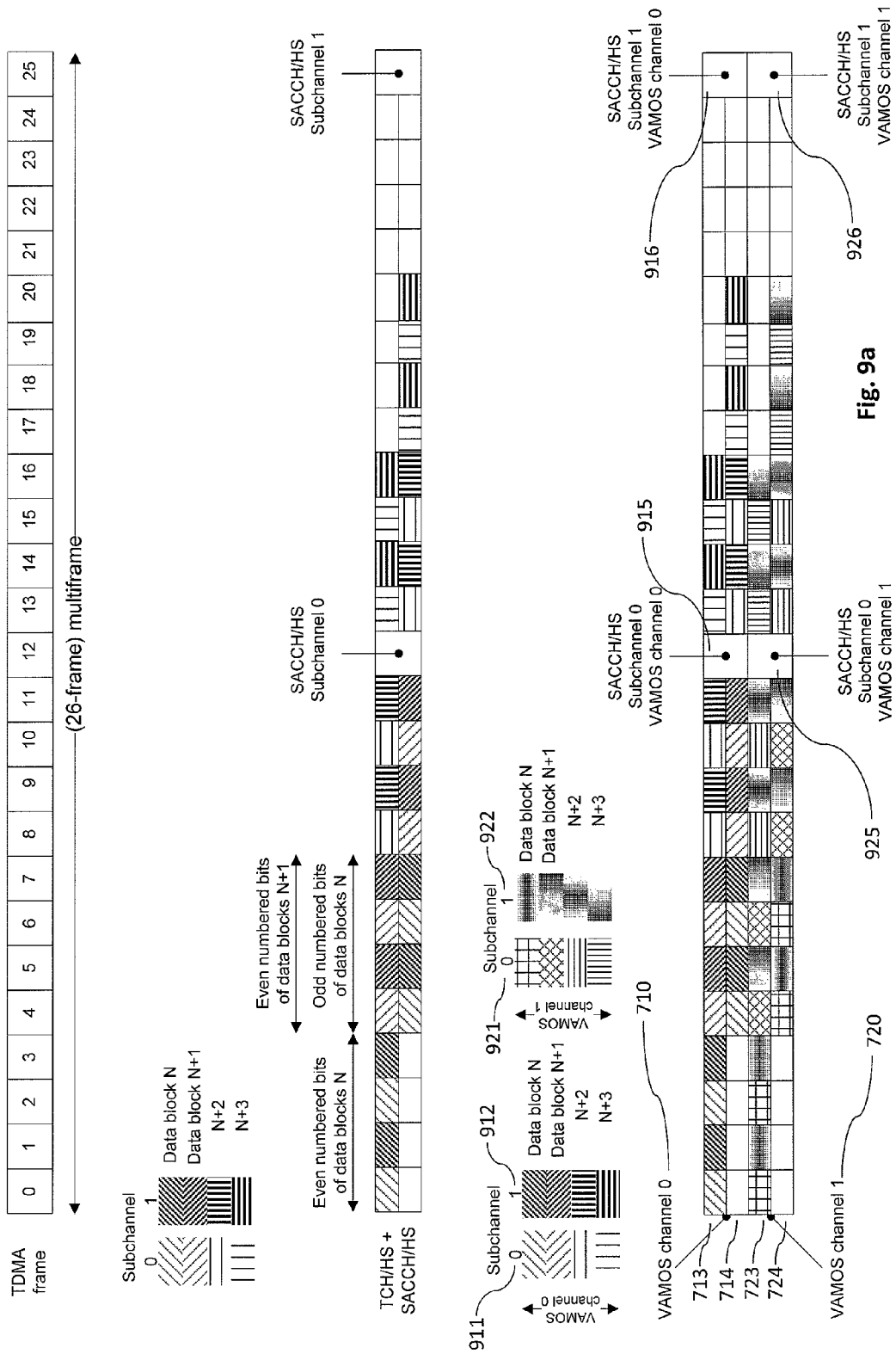

| Channel designation | Sub-channel number | Direction | Allowable time slot assignments | Allowable RF channel assignments | Burst type | Repeat length in TDMA frames | Interleaved block TDMA frame mapping |
|---|---|---|---|---|---|---|---|
| TCH/FS, TCH/EFS, TCH/AFS, TCH/F2.4 & TCH/WFS | | D&U | 0...7 | C0 ... Cn | NB¹ | 13 | B0(0...7),B1(4...7,9...12),B2(9...12,0...3) |
| TCH/HS & TCH/AHS | 0 | D&U | 0...7 | C0 ... Cn | NB¹ | 13 | B0(0,2,4,6),B1(4,6,9,11),B2(9,11,0,2) B0(1,3,5,7),B1(5,7,10,12),B2(10,12,1,3) |
| | 1 | | | | | | |
| TCH/F | | D&U | 0...7 | C0 ... Cn | NB¹ | 13 | B0(0...7),B1(4...7,9...12),B2(9...12,0...3) |
| FACCH/H | 0 | U | 0...7 | C0 ... Cn | NB¹ | 26 | B0(0,2,4,6,9,11),B1(9,11,13,15,17,19),B2(17,19,22,24,0,2) |
| FACCH/H | 0 | D | 0...7 | C0 ... Cn | NB¹ | 26 | B0(4,6,9,11,13,15),B1(13,15,17,19,22,24),B2(22,24,0,2,4,6) |
| FACCH/H | 1 | U | 0...7 | C0 ... Cn | NB¹ | 26 | B0(1,3,5,7,10,12),B1(10,12,14,16,18,20),B2(18,20,23,25,1,3) |
| FACCH/H | 1 | D | 0...7 | C0 ... Cn | NB¹ | 26 | B0(5,7,10,12,14,16),B1(14,16,18,20,23,25),B2(23,25,1,3,5,7) |
| SACCH/TF | 0 | D&U | 0 | C0 ... Cn | NB² | 104 | B(8, 34, 60, 86) |
| SACCH/TF | 0 | D&U | 1 | C0 ... Cn | NB² | 104 | B(21, 47, 73, 99) |
| SACCH/TF | 0 | D&U | 2 | C0 ... Cn | NB² | 104 | B(34, 60, 86, 8) |
| SACCH/TF | 0 | D&U | 3 | C0 ... Cn | NB² | 104 | B(47, 73, 99, 21) |
| SACCH/TF | 0 | D&U | 4 | C0 ... Cn | NB² | 104 | B(60, 86, 8, 34) |
| SACCH/TF | 0 | D&U | 5 | C0 ... Cn | NB² | 104 | B(73, 99, 21, 47) |
| SACCH/TF | 0 | D&U | 6 | C0 ... Cn | NB² | 104 | B(86, 8, 34, 60) |
| SACCH/TF | 0 | D&U | 7 | C0 ... Cn | NB² | 104 | B(99, 21, 47, 73) |
| SACCH/TH | 0 | D&U | 0 | C0 ... Cn | NB² | 104 | B(8, 34, 60, 86) |
| SACCH/TH | 1 | | | | | | B(21, 47, 73, 99) |
| SACCH/TH | 0 | D&U | 1 | C0 ... Cn | NB² | 104 | B(12, 34, 60, 86) |
| SACCH/TH | 1 | | | | | | B(21, 47, 73, 99) |
| SACCH/TH | 0 | D&U | 2 | C0 ... Cn | NB² | 104 | B(34, 60, 86, 8) |
| SACCH/TH | 1 | | | | | | B(47, 73, 99, 21) |
| SACCH/TH | 0 | D&U | 3 | C0 ... Cn | NB² | 104 | B(34, 60, 86, 8) |
| SACCH/TH | 1 | | | | | | B(47, 73, 99, 21) |
| SACCH/TH | 0 | D&U | 4 | C0 ... Cn | NB² | 104 | B(60, 86, 8, 34) |
| SACCH/TH | 1 | | | | | | B(73, 99, 21, 47) |
| SACCH/TH | 0 | D&U | 5 | C0 ... Cn | NB² | 104 | B(60, 86, 8, 34) |
| SACCH/TH | 1 | | | | | | B(73, 99, 21, 47) |
| SACCH/TH | 0 | D&U | 6 | C0 ... Cn | NB² | 104 | B(86, 8, 34, 60) |
| SACCH/TH | 1 | | | | | | B(99, 21, 47, 73) |
| SACCH/TH | 0 | D&U | 7 | C0 ... Cn | NB² | 104 | B(86, 8, 34, 60) |
| SACCH/TH | 1 | | | | | | B(99, 21, 47, 73) |

NOTE 1: An Access Burst (AB) is used on the uplink during handover.
NOTE 2: An Access Burst (AB) may be used on the uplink during handover.

Fig. 9c

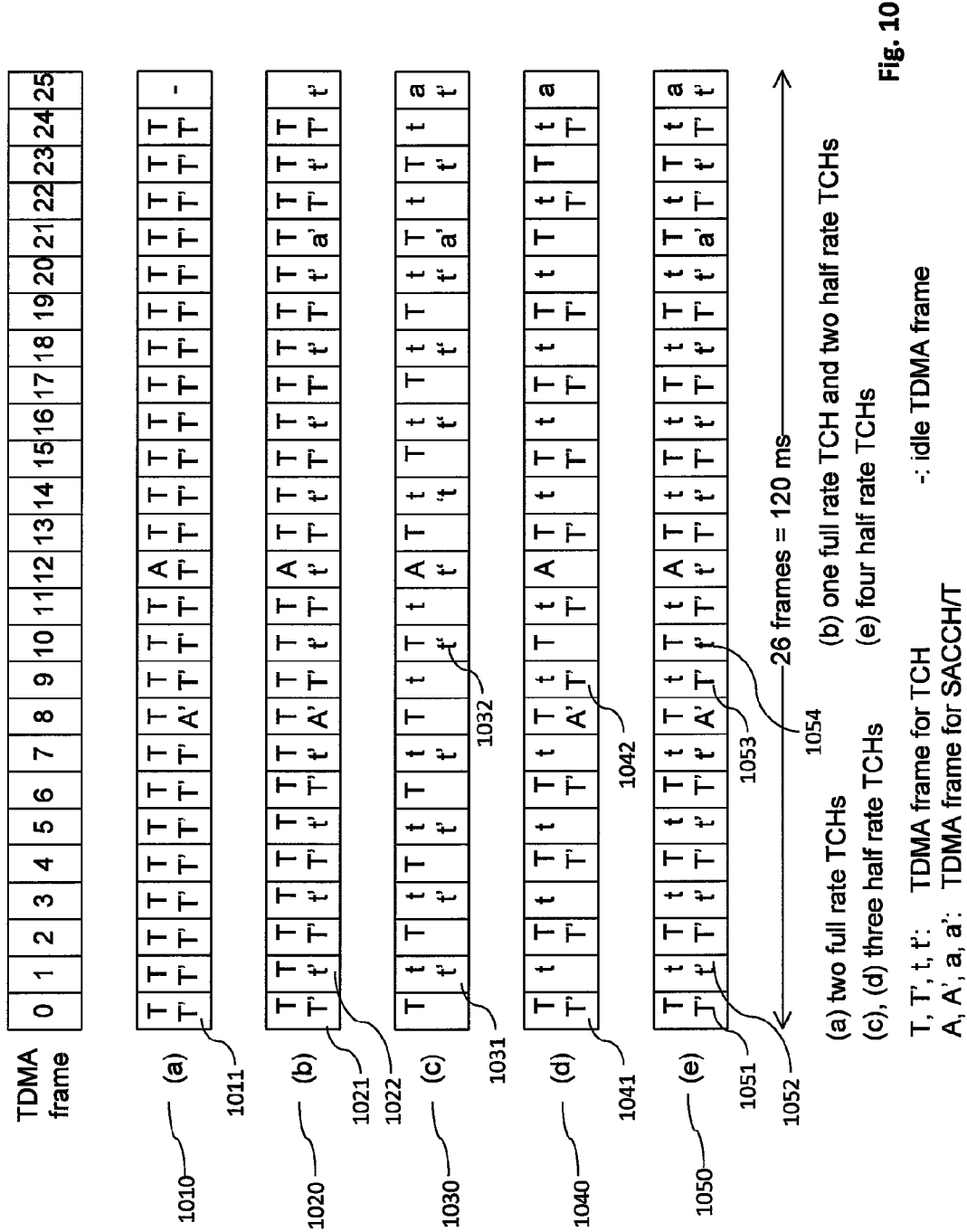

FRAME MAPPING FOR GERAN VOICE CAPACITY ENHANCEMENTS

TECHNICAL FIELD

The present document relates to radio transmission. In particular, it relates to the mapping of frames in a GSM EDGE Radio Access Network (GERAN).

BACKGROUND

In GSM, circuit-switched point-to-point transmission of speech is specified in a way that at any given point in time data transmitted in a radio burst pertains only to a single point-to-point connection. In order to increase system capacity for speech, 3GPP TSG GERAN currently works towards specifying a multiplexing technology which allows the transmission of two data streams pertaining to two different point-to-point connections simultaneously during a burst or time frame. This initiative is referred to as VAMOS (Voice Services over Adaptive Multi-user channels on One Slot).

SUMMARY

The present document proposes an optimized mapping of the frames of the Slow Associated Control Channel (SACCH) in the GSM multi frame structure where two users are multiplexed on the same physical resource. A benefit of the proposed mapping is that the link performance for SACCH, i.e. the link performance for slow associated control channels, benefits from Discontinuous Transmission (DTX) in a similar manner as the link performance for the corresponding Traffic Channel (TCH) does.

According to a first aspect, a GERAN base station is described. The GERAN base station may comprise one or more transceivers and a controller. The base station and in particular the transceiver may be operable to communicate with a first mobile station via a first VAMOS channel and operable to communicate with a second mobile station via a second corresponding VAMOS channel. For this communication, the base station may use a control channel of the second VAMOS channel which is offset by 4 or 8 TDMA frames with respect to a control channel of the corresponding first VAMOS channel. Typically, the control channels are referred to as SACCH (Slow Associated Control Channel) and are different from the traffic channels (TCH) of the VAMOS channels which carry actual speech data.

Typically, the first and second VAMOS channel share a common time slot within a TDMA frame. By doing this, the overall capacity of the GERAN can be increased, due to the fact that two speech connections may be transmitted using the same time slot. In order to differentiate the first and second VAMOS channel, a different training sequence code (TSC) within the common time slot may be assigned to each VAMOS channel. Furthermore, a signal constellation may be used by the first VAMOS channel, which is orthogonal to a signal constellation used by the second VAMOS channel. This orthogonality constraint may be used by a GERAN receiver to differentiate between the two VAMOS channels.

In particular, the control channel of the first VAMOS channel may be transmitted at TDMA frame number 12 of a multiframe, and the control channel of the second VAMOS channel may be transmitted at TDMA frame number 4 or 8 of a multiframe. As will be outlined at a later stage, it may be beneficial to use a control channel of the second VAMOS channel which is transmitted at TDMA frame number 8 of a multiframe. By doing this, the collision between SID frames and SACCH frames during discontinuous transmission (DTX) operation may be avoided.

It may occur that a further control channel of the first VAMOS channel is transmitted at TDMA frame number 25 of a multiframe and a further control channel of the second VAMOS channel is transmitted at TDMA frame number 17 or 21 of a multiframe. It may be particularly beneficial if the further control channel of the second VAMOS channel is transmitted at TDMA frame number 21 of a multiframe. Such further control channels are typically used, when a VAMOS channel is operated at half rate, such that a first and second sub-channel is defined for such a VAMOS channel. A VAMOS channel operated at half rate would typically have a control channel for the first subchannel and a further control channel for the second subchannel.

In general, it should be noted that the first VAMOS channel may be a full rate or a half rate channel. This also applies to the second VAMOS channel, which may be a full rate or a half rate channel. Any combinations are possible. Furthermore, the first and second VAMOS channels may use any one of: half rate, full rate, enhanced full rate, adaptive multi-rate speech encoding. Again, it should be noted that any combinations are possible.

According to a further aspect, the time for transmitting a speech block using VAMOS channels may be smaller or equal to eight TDMA frames. Furthermore, the time for transmitting a speech block using VAMOS channels may be greater or equal to six TDMA frames. This typically applies to VAMOS channels which are operated at full rate, as well as to VAMOS channels which are operated at half rate. It may also be beneficial that the variance of the time for the transmission of a speech block measured in number of TDMA frames is the same for the first and second VAMOS channel. Overall, this may ensure that the buffering requirements and delay properties of the VAMOS channels remain within the boundaries known for conventional GSM speech channels. As outlined above, the present document is particularly relevant for discontinuous transmission, e.g. for discontinuous transmission of the first or second or both VAMOS channels. Typically, at least one silence descriptor (SID) frame is transmitted on the VAMOS channel which performs discontinuous transmission and it may be beneficial that the at least one silence descriptor frame does not coincide with the control channel of the other VAMOS channel. In other words, the control channel of the other VAMOS channel is positioned such that it does not interfere with the transmission of a SID frame on the VAMOS channel which is in DTX operation.

According to another aspect, the base station may be operable to perform optimized pairing of mobile stations. Such pairing may be required in order to select a set of mobile stations which share corresponding VAMOS channels. The pairing can be done, such that the interference between the different connections is balanced. In an embodiment, the base station may be operable to select the first and the second mobile station for communication over the first and second VAMOS channel, such that the link performance of the first and the second VAMOS channel is maximized. It may also be beneficial to select the first and the second mobile station for communication over the first and second VAMOS channel, such that the link performance of the first and the second VAMOS channel exceeds a pre-determined threshold value.

It should be noted that it may be beneficial to extend the pairing to a higher number of mobile stations. Notably, when a VAMOS channel is operated at half rate, additional mobile stations may need to be considered. It both VAMOS channels are operated at half rate, then up to four mobile stations may need to be paired. By way of example, the second VAMOS channel may be operated at half rate and the base station or transceiver may be operable to communicate with the second mobile station via a first subchannel of the second VAMOS channel, and to communicate with a third mobile station via a second subchannel of the second VAMOS channel. Furthermore, the base station may be operable to select the first, second and third mobile station, such that the link performance of the first VAMOS channel, and the link performance of the first and second subchannel of the second VAMOS channel is maximized or exceeds a pre-determined threshold value.

The base station may be operable to select the first, second and third mobile station by evaluating the interference between the first VAMOS channel and the first subchannel of the second VAMOS channel, and by evaluating the interference between the first VAMOS channel and the second subchannel of the second VAMOS channel. In other words, the base station may take into account the interference between the first VAMOS channel and both subchannels of the second VAMOS channel. The base station may not need to consider the interference between the two subchannels of the second VAMOS channel, as these subchannels are transmitted during different TDMA frames. If both VAMOS channels are operated at half rate, the base station may therefore consider the interference between the first subchannel of the first VAMOS channel and the two subchannels of the second VAMOS channel; as well as the interference between the second subchannel of the first VAMOS channel and the two subchannels of the second VAMOS channel. I.e. four interference pairs would be considered for the pairing of four mobile stations.

According to another aspect, the first and the second VAMOS channel may be operated at half rate, each comprising a first and a second subchannel. For the first and the second VAMOS channel, two TDMA frames of the first or second subchannel would never be directly adjacent. Such adjacent TDMA frames assigned to the same subchannel typically impact link quality and should therefore be avoided.

According to a further aspect, a reporting period of the first VAMOS channel may correspond to a reporting period of the second VAMOS channel. Typically a reporting period is defined by a set of four multiframes, i.e. a set of four SACCH frames of a VAMOS channel or a subchannel of a VAMOS channel, which define a complete control message. It may also be beneficial if the reporting period of the first VAMOS channel is offset to a reporting period of the second VAMOS channel, wherein the offset of the reporting period corresponds to the offset of the control channels.

According to a further aspect a GERAN transmitter is described. The transmitter may be operable to establish a first VAMOS channel, wherein a control channel of the first VAMOS channel is offset by 4 or 8 TDMA frames with respect to a control channel of a corresponding second VAMOS channel. The different features and aspects outlined in the present document may also be applied to the GERAN transmitter.

According to another aspect a GERAN receiver is described. The receiver may be operable to decode a control channel of a first VAMOS channel which is offset by 4 or 8 TDMA frames with respect to a control channel of a corresponding second VAMOS channel. The different features and aspects outlined in the present document may also be applied to the GERAN receiver.

According to a further aspect a GERAN compatible mobile station is described. Such mobile stations may be mobile telephones, smartphones, PDAs, mobile computers, etc. Mobile stations may also be referred to as user equipments. The mobile station may comprise a transceiver which is operable to communicate with a GERAN base station via a first VAMOS channel. Furthermore, the interference caused by a second mobile station which communicates with the base station via a second corresponding VAMOS channel may be processed. The processing may comprise interference cancellation, e.g. using channel equalization. The mobile station may use a control channel of the first VAMOS channel which is offset by 4 or 8 TDMA frames with respect to a control channel of the corresponding second VAMOS channel. Furthermore, the different features and aspects outlined in the present document, in particular in the context of control channel assignment of a bases station, may also be applied to the mobile station.

According to another aspect, a radio interface for a GERAN is described. The radio interface may specify a first and a second VAMOS channel within one time slot of a TDMA frame, wherein a control channel of the first VAMOS channel is offset by 4 or 8 TDMA frames with respect to a control channel of the corresponding second VAMOS channel. The different features and aspects outlined in the present document may also be applied to the radio interface.

According to a further aspect a radio signal associated with a VAMOS channel is described. The VAMOS channel comprises a control channel that is offset by 4 or 8 TDMA frames with respect to a control channel of a corresponding VAMOS channel. The different features and aspects outlined in the present document may also be applied to the radio signal.

According to a further aspect, a method for reducing interference of a first and a second VAMOS channel during DTX operation of at least one of the two VAMOS channels is described. The method may comprise communicating between a base station and a first mobile station via the first VAMOS channel, and communicating between the base station and a second mobile station via the second VAMOS channel. The method may further comprise using a control channel in a multiframe of the first VAMOS channel which is offset by 4 or 8 TDMA frames with respect to the control channel in a multiframe of a second VAMOS channel. The different features and aspects outlined in the present document, in particular in the context of control channel assignment, may also be applied to the above method.

According to another aspect a GERAN base station is described. The GERAN base station may be operable to set up a first VAMOS channel to a first mobile device; to set up a first subchannel of a second VAMOS channel to a second mobile device; and to set up a third subchannel of a second VAMOS channel to a third mobile device. The base station may be further operable to select the first, second and third mobile station, such that the link performance of the first VAMOS channel, and the link performance of the first and second subchannel of the second VAMOS channel each exceed a pre-determined threshold value. The different features and aspects outlined in the present document may also be applied to the above GERAN base station.

According to another aspect, a method for pairing a first, second and third mobile station at a GERAN base station is described. The first mobile station can communicate with the base station on a first VAMOS channel. The second mobile station can communicate with the base station on a first subchannel of a corresponding second VAMOS channel and the third mobile station can communicate with the base station on a second subchannel of the second VAMOS channel. The method may comprise selecting the first, second and third mobile station from a plurality of mobile stations within a coverage area of the base station, such that the link performance of the first VAMOS channel, and the first and second subchannel of the second VAMOS channel each exceed a pre-determined threshold value. Furthermore, the method may comprise setting up the first VAMOS channel to the first mobile device; setting up the first subchannel of the second VAMOS channel to the second mobile device; and setting up the third subchannel of the second VAMOS channel to the third mobile device. The different features and aspects outlined in the present document may also be applied to the above method.

It should be noted that the methods and systems including its preferred embodiments as outlined in the present patent application may be used standalone or in combination with the other methods and systems disclosed in this document. Furthermore, all aspects of the methods and systems outlined in the present patent application may be arbitrarily combined. In particular, the features of the claims may be combined with one another in an arbitrary manner, such as features explicitly disclosed in relation to a base station are applicable to a corresponding mobile device as well.

DESCRIPTION OF THE FIGURES

The disclosure is explained below in an illustrative manner with reference to the accompanying drawings, wherein

FIGS. 8a and 8b illustrate an example TDMA frame mapping for TCH/FS with overlapping and re-positioned SACCH, respectively;

FIGS. 9a and 9b illustrate an example TDMA frame mapping for TCH/HS with overlapping and re-positioned SACCH, respectively;

FIG. 9c illustrates an example mapping of logical channels onto physical channels for a second VAMOS channel;

FIG. 10 illustrates the different interference situations of VAMOS channels using re-positioned SACCH;

Figure 1:
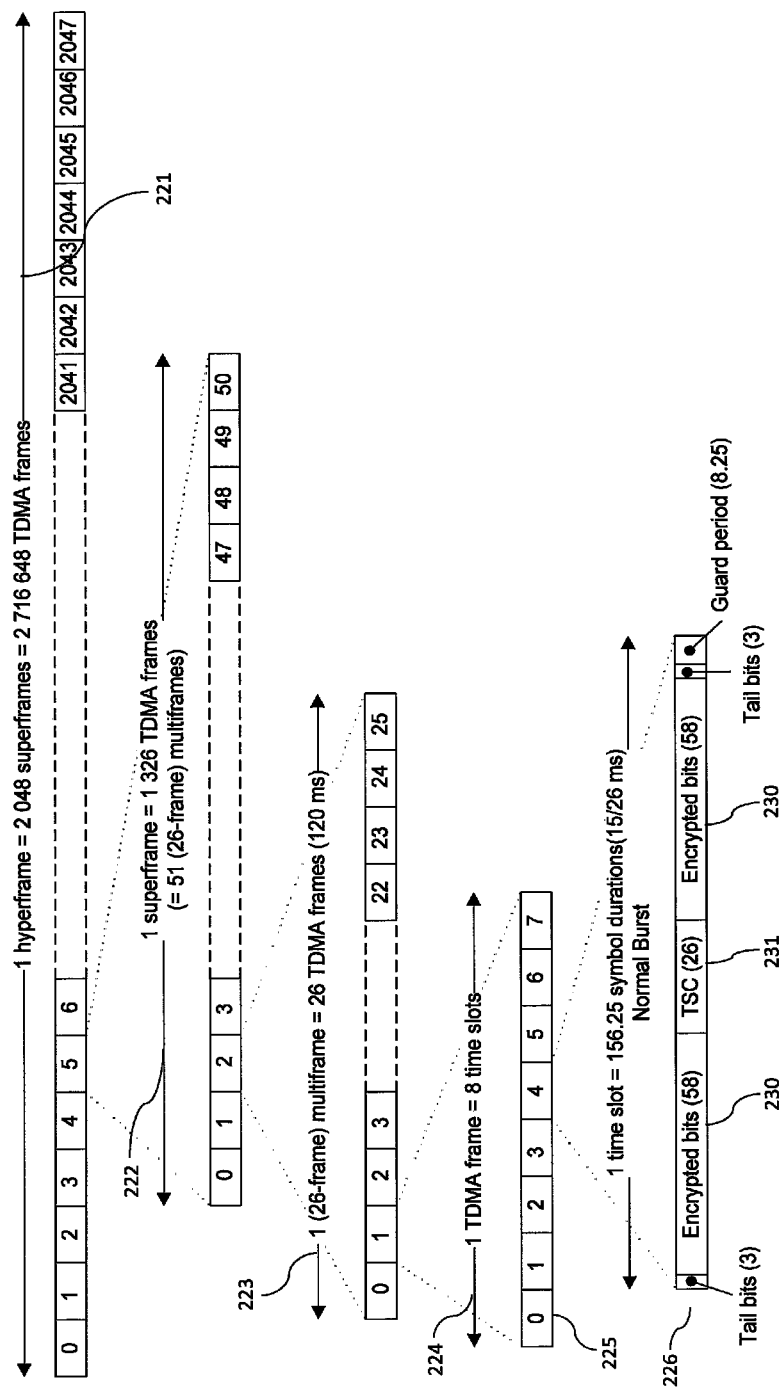
FIG. 1 illustrates an example frame, timeslot and bust structure of GSM.

The document 3GPP TS 45.001 "Physical layer on the radio path; General description" describes among other things the frame and time slot structure used in GSM. This document is incorporated by reference. The access scheme in GSM uses Time Division Multiple Access (TDMA) with eight basic physical channels per carrier. These physical channels (PCH) are also referred to as time slots. A diagrammatic representation of an excerpt of the time frame to structures is shown in FIG. 1.

The longest recurrent time period of the structure is called a hyperframe 221. The TDMA frames are numbered modulo this hyperframe 221, i.e. the TDMA frame numbers (FN) go from 0 to 2 715 647. One hyperframe 221 is subdivided in 2048 superframes 222. The superframe 222 is itself subdivided in multiframes 223. Four types of multiframes 223 exist in the system defined in the above mentioned document 3GPP TS 45.001 of which one is shown in FIG. 1. The shown multiframe 223 which is also referred to as "26-frame multiframe" comprises 26 TDMA frames 224 and has a duration of 120 ms. As can be seen in FIG. 1, the TDMA frame 224 comprises eight time slots 225. The time slot 225 typically represents a time interval of 15/26 ms and its physical content is called a burst 226. The normal burst 226 (NB), which is illustrated in FIG. 1, is used to carry information on traffic and control channels. It contains 116, i.e. 58 plus 58, encrypted symbols 230, which can also be referred to as the payload symbols 230. Typically, each set of encrypted symbols 230 comprises a so called stealing symbol, which is used at the receiver to distinguish between control and traffic payload. Furthermore, it comprises 26 Training Sequence Code (TSC) symbols 231 used to train the equalizer settings at the respective radio receiver, i.e. the Mobile Station (MS) or the Base Station (BTS), respectively. In addition, the burst 226 may comprise tail symbols and a guard period.

It should be noted that the bursts 226 shown in FIG. 1 typically comprise data symbols. Depending on the underlying modulation scheme, these symbols may carry one bit, as is the case for GMSK modulated speech transmission, or several bits, as is the case for EDGE data transmission.

Figure 2:
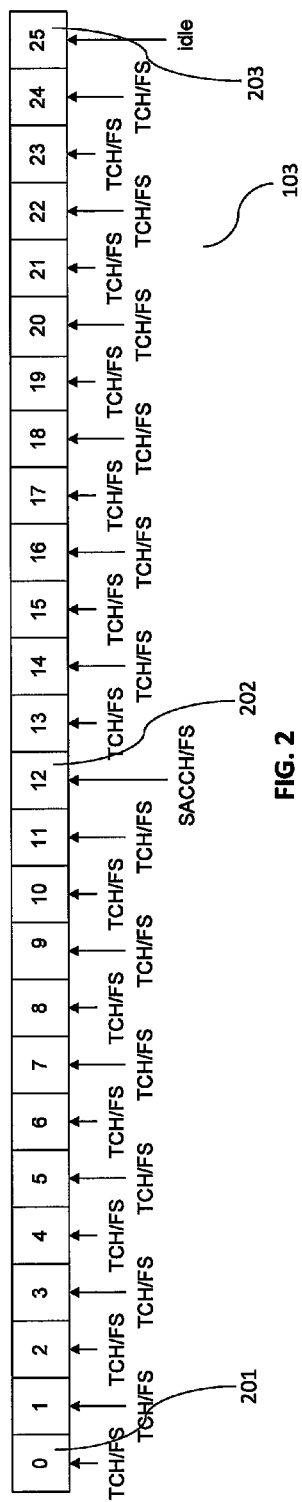
FIG. 2 illustrates an example TDMA frame mapping for TCH/FS and SACCH/FS.
Figure 3:
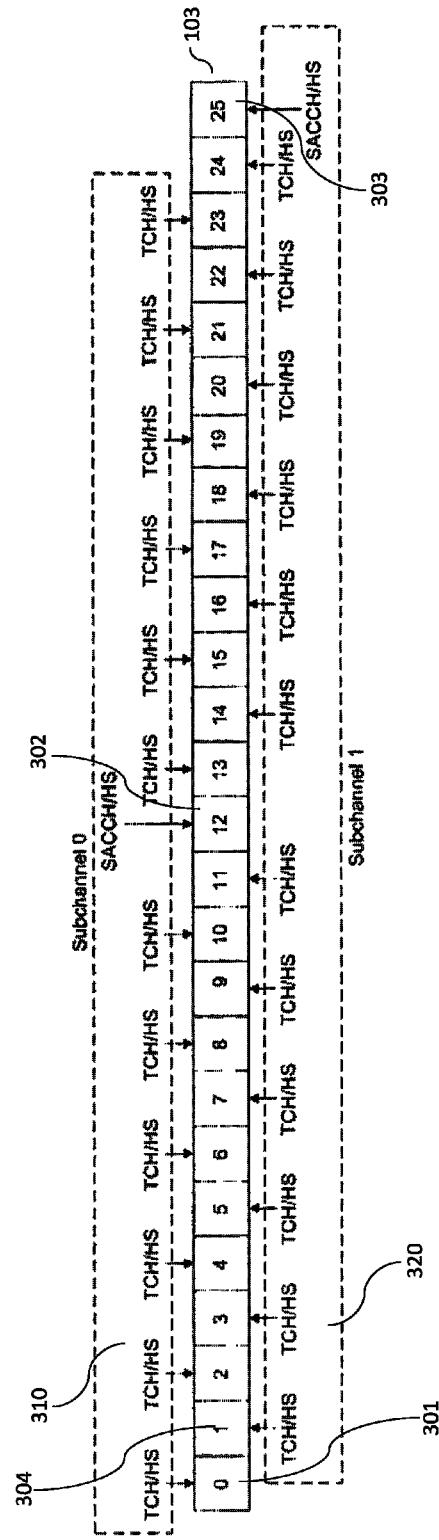
FIG. 3 shows an example TDMA frame mapping for TCH/HS and SACCH HS, for the subchannels 0 and 1.

In the following, it is outlined, how speech traffic is mapped into a TDMA frame 224 or more specifically into a multiframe 223. TDMA frame mapping is specified in the document 3GPP TS 45.002 "Multiplexing and multiple access on the radio path", which is incorporated by reference. FIGS. 2 and 3 depict the mapping of traffic channels for full rate speech and half rate speech together with the associated control channels on a (26-frame) multiframe 223. In FIG. 2, it can be seen that the TDMA frames 0 to 11 and 13 to 24 are used for full rate speech traffic. The reference sign 201 identifies an example TDMA frame. In FIG. 2, the full rate speech frames are referred to as TCH/FS, i.e. as traffic channels for full rate speech. Traffic channels (TCH) are also referred to as Bm channels, in analogy to an ISDN B channel. So called full rate channels typically assign one time slot of a TDMA frame to one speech connection. The speech may be encoded at bit-rates up to 14 kbit/s wherein the remaining channel bit-rate is typically used for channel coding (e.g. Forward Error Correction), etc.

As shown in FIG. 2, the TDMA frame with frame number 12, identified by reference number 202, is assigned to the control of the traffic channel. This control channel is referred to as the Slow Associated control Channel (SACCH) for full rate speech traffic (FS), SACCH/FS. Its normal function is to carry system information messages on the downlink, i.e. from the respective transmitter to the respective receiver, to carry receiver measurement reports on the uplink and to perform closed-loop power and timing control. As full rate speech channels TCH/FS typically only require one SACCH/FS channel, the TDMA frame 25 remains idle. This idle frame is identified by reference sign 203.

FIG. 3 illustrates the mapping of traffic channels (TCH) at half rate speech (HS) to the TDMA frames of the multiframe 223. Half rate systems typically assign succeeding TDMA frames to two one-to-one speech connections in an alternating manner. By doing this, two separate subchannels are defined, referred to as subchannel 0 (reference sign 310) and subchannel 1 (reference sign 320). In other words, the TDMA frames with even numbers (e.g. TDMA frame 301) may be assigned to subchannel 0 and the TDMA frames with uneven numbers (e.g. TDMA frame 304) may be assigned to subchannel 1.

In a similar manner to the full rate speech system, a subset of the TDMA frames is used for the traffic channel. These frames are marked as TCH/HS in FIG. 3. More precisely, all TDMA frames of subchannel 0, i.e. all the even TDMA channels, except for TDMA channel 12 (identified by reference sign 302) are used for the transmission of speech traffic. In case of subchannel 1, all the uneven TDMA channels, except for TDMA channel 25 (identified by reference sign 303), are used as traffic channels TCH/HS.

Due to the fact that half rate channels only use half of the available TDMA frames compared to full rate channels, the bit-rate which is available for speech traffic is half the bit-rate of full rate channels. The actual data capacity for compressed speech is typically limited to 7 kbit/s in half rate traffic channels.

In the following, further details on speech encoding and channel encoding are provided. In this context, reference is made to the document 3GPP TS45.003 "Channel Coding", which is incorporated by reference.

The speech encoder/decoder (codec) delivers to the channel encoder a sequence of blocks of data, i.e. a sequence of blocks of compressed speech data. One block of data corresponds to one speech frame and typically covers a length of 20 ms of the underlying speech signal. The length of the blocks delivered by the speech codec depends on the speech codec type and the coding mode in use. Typical speech codecs used in the context of GERAN rely on LPC (linear predictive coding) and are referred to as half rate (HR), full rate (FR) or enhanced full rate (EFR) codecs. A further speech codec is known as adaptive multi-rate (AMR) speech codec. The speech data blocks are channel encoded, reordered, interleaved and mapped to bursts as described in the above mentioned document 3GPP TS 45.003.

Figure 4:
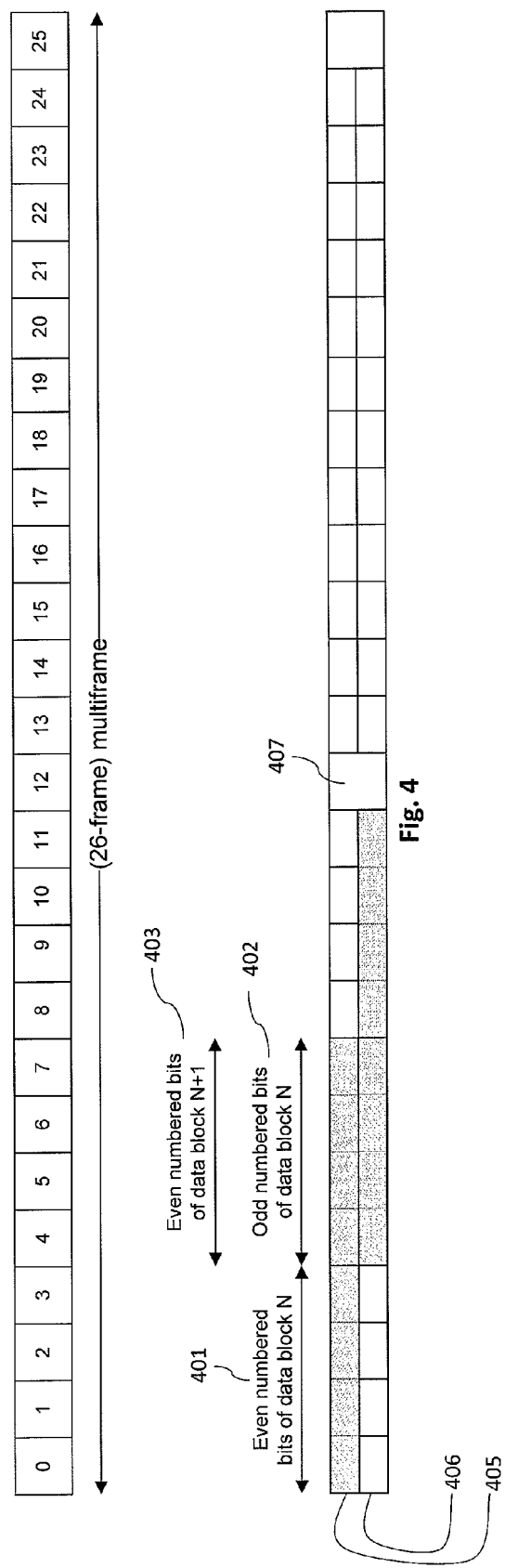
FIG. 4 illustrates an example TDMA frame mapping for FR channels.

Reference is made to FIG. 4, where a typical frame mapping is illustrated for full rate channels. Traffic channels (TCH) use so called 8-burst diagonal interleaving, in order to distribute a block of speech data across 8 TDMA frames 224. For this purpose, only half the encrypted symbols 230 of a burst 226 are assigned to a particular speech block and the other half is assigned to a succeeding speech block. Thereby a speech block which could normally be transmitted in four TDMA frames is spread across 8 bursts. This interleaving pattern makes the traffic channels robust against single burst fades, since the loss of a single burst destroys only ⅛ of the blocks' content.

For full rate (FR) channels, the result of the interleaving is a distribution of the reordered bits of a given data block, n=N, over 8 blocks using the even numbered bits of the first 4 blocks ($B=B_0+4N+0, 1, 2, 3$) and the odd numbered bits of the last 4 blocks ($B=B_0+4N+4, 5, 6, 7$). The reordered bits of the following data block, n=N+1, use the even numbered bits of the blocks $B=B_0+4N+4, 5, 6, 7$ ($B=B_0+4(N+1)+0, 1, 2, 3$) and the odd numbered bits of the blocks $B=B_0+4(N+1)+4, 5, 6, 7$. Continuing with the next data blocks shows that one block typically carries 57 bits of data from one block (n=N) and 57 bits of data from the next block (n=N+1), where the bits from the block with the higher number always are the even numbered data bits, and those of the data block with the lower number are the odd numbered bits. The block of coded data is interleaved "block diagonal", where a new data block starts every $4^{th}$ block and is distributed over 8 blocks. This is shown in FIG. 4, where the even numbered bits or symbols of data block N (reference sign 401) are succeeded by the odd numbered bits or symbols of data block N (reference sign 402).

The upper row of frames 405 indicates the first half of the encrypted symbols 230 of a burst 226 and the lower row of frames 406 indicates the second half of the encrypted symbols 230 of the burst 226. It can be seen from FIG. 4, that while the odd numbered bits or symbols of data block N 402 are transmitted in the second half 406 of the bursts 226, the even numbered bits or symbols of data block N+1 (reference sign 403), i.e. of the succeeding data block, are transmitted on the first half 405 of the bursts 226.

FIG. 4 also shows the TDMA frame 407 used for the SACCH. It can be seen that the complete burst 226, i.e. both parts of the encrypted symbols 230, is used to map the control information. It should be noted that typically one complete SACCH block is spread across 4 succeeding multiframes (reference number 223). In other words, a new SACCH block starts every 104 frames, i.e. 4 times 26 frames.

It should also be noted that in this and the subsequent figures which show TDMA frame mappings a filled frame represents a single time slot in that frame, i.e. the data is transmitted during a single time slot in each TDMA frame. In other words, the TDMA frame mapping diagrams are depicted for one time slot, e.g. time slot 0. Similar TDMA frame mapping diagrams can be drawn for the other time slots, e.g. time slots 1, ..., 7.

Figure 5:
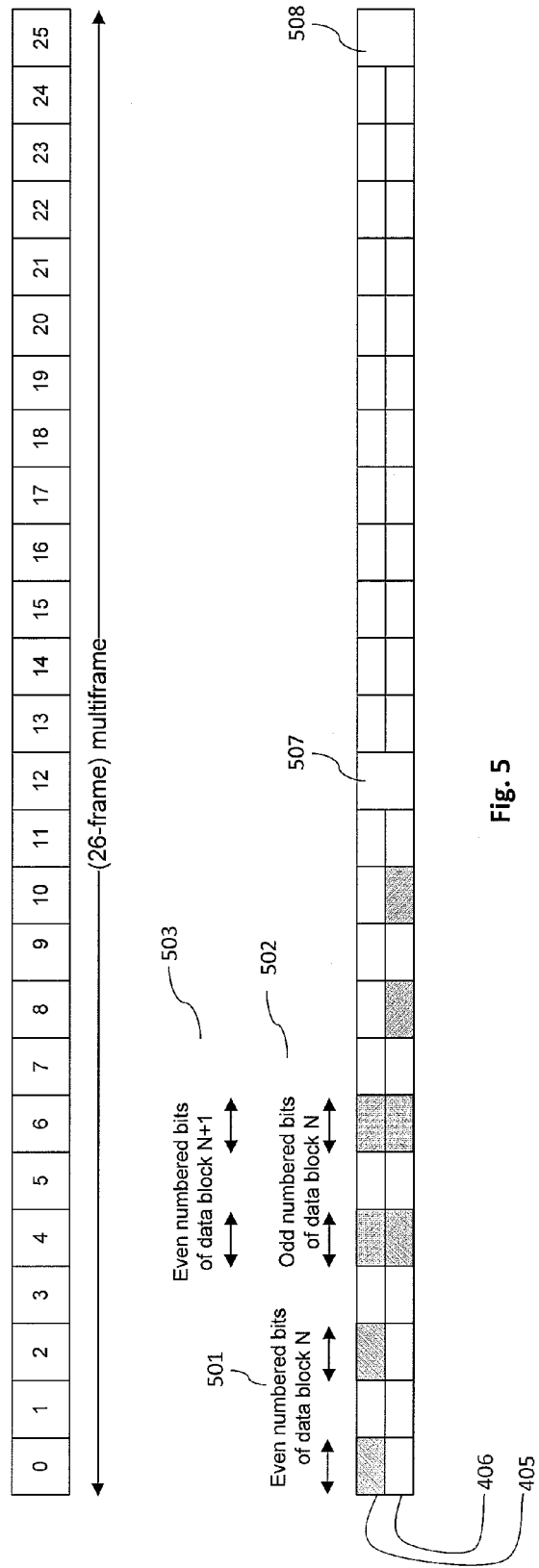
FIG. 5 illustrates an example TDMA frame mapping for HR channels.

A similar frame mapping can also be defined for half rate channels. As outlined in the context of FIG. 3, in case of half rate traffic the multiframe 223 is subdivided into two subchannels 310 and 320. In FIG. 5, the frame mapping of half rate channels is shown for subchannel 0 comprising the even TDMA frames. It can be seen that one speech block is spread across 8 TDMA frames, whereby only four of these frames are assigned to subchannel 0. Similar to FIG. 4, the upper row of frames 405 indicates the first half of the encrypted symbols 230 of a burst 226, whereas the lower row of frames 406 indicates the second half of the encrypted symbols 230 of the burst 226. The even numbered bits or symbols of a data block N (reference sign 501) are succeeded by the odd numbered bits of data blocks N (reference sign 502). The latter share the bursts or TDMA frames with the even numbered bits of the succeeding data block N+1 (reference sign 503).

In other words, for half rate (HR) channels, the result of the interleaving is a distribution of the reordered bits of a given data block, n=N, over four blocks using the even numbered bits of the first two blocks ($B=B_0+4N+0, 1$) and the odd numbered bits of the last two blocks ($B=B_0+2N+2, 3$). The reordered bits of the following data block, n=N+1, use the even numbered bits of the blocks $B=B_0+2N+2, 3$ ($B=B_0+2(N+1)+0, 1$) and the odd numbered bits of the blocks $B=B_0+2(N+1)+2, 3$. Continuing with the next data blocks shows that one block always carries 57 bits of data from one block (n=N) and 57 bits of data from the next block (n=N+1), where the bits from the block with the higher number always are the even numbered data bits, and those of the data block with the lower number are the odd numbered bits.

The block of coded data is interleaved "block diagonal", where a new data block starts every $2^{nd}$ block and is distributed over 4 blocks. It should be noted that each of the half rate traffic channels has an associated SACCH, which is provided in the TDMA frames 507 and 508, respectively. The SACCH channels make use of the complete frames or bursts. Similar to the full rate channels, four succeeding multiframes 223 are required, in order to transmit a complete SACCH message. This succession of four multiframes 223 is also referred to as a reporting period.

A major issue in radio communication is the interference between the different radio channels. Discontinuous transmission (DTX) is a mechanism which allows the radio transmitter to be switched off most of the time during speech pauses for the purpose of saving power in the mobile station (MS) and reducing the overall interference level in the air. Certain aspects of DTX are described in the document 3GPP TS 46.031 "Full rate speech; Discontinuous Transmission (DTX) for full rate speech traffic channels" which is incorporated by reference.

The DTX mechanism typically requires the following functions:
  A voice activity detector (VAD) on the transmit side;
  Evaluation of the background acoustic noise on the transmit side in order to transmit characteristic parameters to the receive side;
  Generation on the receive side of a similar noise, called comfort noise, during periods where the radio transmission is cut.

The information on the background noise is transmitted either during a predefined set of TDMA frames (for full rate, half rate and enhanced full rate speech codecs) or at a defined distances from the last speech frame (for adaptive multi rate speech codecs). This information is transmitted in so called Silence Descriptor (SID) messages. For FR, HR and EFR codecs this information on background noise (SID) is sent during DTX operation in a predefined set of TDMA frames, which are specified in section 8.3 of the document 3GPP TS 45.008 "Radio subsystem link control". This document is incorporated by reference.

Table 1 shows the mapping of SID frames for FR, HR, and EFR codecs. The frame numbers refer to the frame number in a succession of four multiframes 223, i.e. in a succession of a total of 104 TDMA frames. During DTX operation, no traffic is sent of the traffic channel. Only the SACCH frames are used, in order to maintain the signalling and the overall connection. Furthermore, SID information is sent in the TDMA frames listed in Table 1, in order to allow for a generation of comfort noise at the receiver.

TABLE 1

| Type of channel | TDMA frame number (FN) modulo 104 |
| --- | --- |
| TCH/F | 52, 53, 54, 55, 56, 57, 58, 59 |
| TCH/HS, subchannel 0 | 0, 2, 4, 6, 52, 54, 56, 58 |
| TCH/HS, subchannel 1 | 14, 16, 18, 20, 66, 68, 70, 72 |

In case of adaptive multi rate (AMR) speech codecs, the SID frames are sent in a regular sequence of 8 frames following the last transmitted speech frame. By consequence, the TDMA frame number for SID information continuously varies depending on the frame number at which DTX operation is started.

In the following, a method for increasing the system capacity for voice in a radio communication system is described. This method is referred to as "Voice services over Adaptive Multi-user channels on One Slot" (VAMOS). It is a method to increase system capacity for voice by multiplexing the signal of two mobile stations (MS) on the same physical resource. In other words, data streams pertaining to two different point-to-point connections are transmitted simultaneously during a burst, i.e. within one time slot. Certain aspects of VAMOS are described in the document 3GPP TR 45.914 "Circuit Switched Voice Capacity Evolution for GSM/EDGE Radio Access Network (GERAN)" which is incorporated by reference.

As outlined above, VAMOS suggests the transmission of two speech channels on the same time slot. This means that two bursts 226 comprising the encrypted symbols 230 for two separate point-to-point speech connections are transmitted within the same time slot 225. This would typically generate a high level of interference between the two point-to-point connections. In order to allow for a receiver to identify the bursts 226 which belong to the respective point-to-point connection, the data streams use different training sequence codes (TSCs) 231 for each user. This concept is used for both directions, i.e. for the downlink direction from a base station (BTS) to a mobile station (MS) and for the uplink direction from a mobile station (MS) to the base station (BTS).

Figure 6:
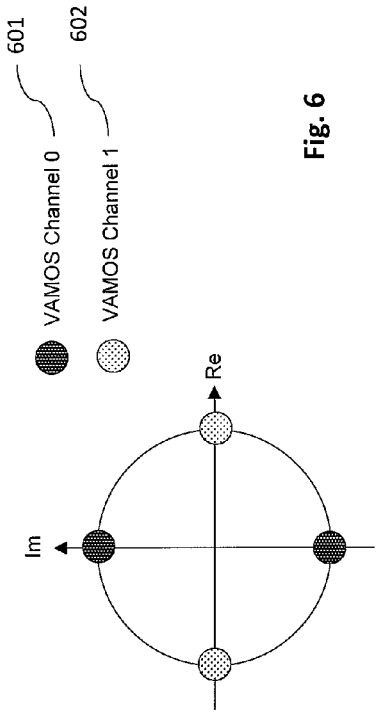
FIG. 6 illustrates an example signal constellation for VAMOS.

In addition, in the downlink direction the two data streams may be mapped onto a variation of quadrature amplitude modulation (QAM) which is shown in FIG. 6. I.e. in extension of a PSK or GMSK modulation scheme used for channels with only one point-to-point speech connection per time slot, a QAM modulation may be used, where each of the two VAMOS channels 601 and 602 is modulated by a PSK or GMSK modulation scheme. The modulation scheme used for the VAMOS channel 0 (reference sign 601) uses a constellation which is orthogonal to the constellation of the modulation scheme used for the VAMOS channel 1 (reference sign 602). This orthogonality constraint can be used by the receiver, i.e. in the case of the downlink direction the mobile station, to distinguish between the two superimposed VAMOS channels 601 and 602 and thereby extract the VAMOS channel which it is meant to receive.

Figure 7:
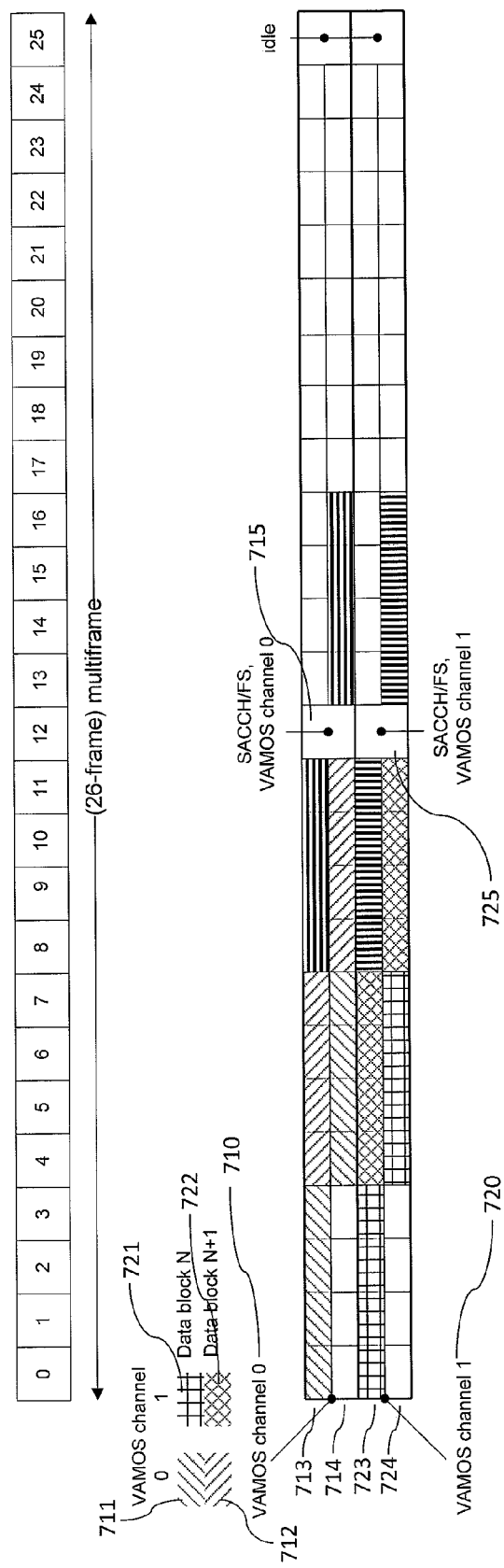
FIG. 7 illustrates an example TDMA frame mapping for VAMOS.

In the following, the mapping of speech blocks outlined in the context of FIG. 4 is applied to a pair of VAMOS channels. FIG. 7 shows the resulting frame mapping for two full rate VAMOS channels 710 and 720. The data symbols for VAMOS channel 0 (reference sign 710) and VAMOS channel 1 (reference sign 720) are transmitted during the same time slot on the same frequency. Typically, the two VAMOS channels 710 and 720 can be differentiated by the different TSC used for each VAMOS channel. In analogy to FIG. 4, it is shown how speech blocks are assigned to the different frames. The upper row of frames 713 of VAMOS channel 710 illustrates the first half of encrypted symbols 230 of a burst 226, whereas the lower row of frame 714 of VAMOS channel 710 illustrates the other half of encrypted symbols 230 of a burst 226. In a similar manner, the upper row of frames 723 of VAMOS channel 720 illustrates the first half of encrypted symbols 230 of a burst 226, whereas the lower row of frame 724 of VAMOS channel 720 illustrates the other half of encrypted symbols 230 of a burst 226.

The different speech blocks which are transmitted over the two VAMOS channels 710 and 720 are represented by different shadings. Shading 711 indicates the data comprised in the $N^{th}$ block of VAMOS channel 0 (reference sign 710). Shading 712 indicates the data comprised in the $(N+1)^{th}$ block of VAMOS channel 0 (reference sign 710). Shading 721 indicates the data comprised in the $N^{th}$ block of VAMOS channel 1 (reference sign 720). Shading 722 indicates the data comprised in the $(N+1)^{th}$ block of VAMOS channel 1 (reference sign 720). It can be seen how data from the different speech blocks is assigned to the different TDMA frames and the different VAMOS channels 710, 720. This assignment or mapping typically follows the mapping outlined in relation to FIG. 4.

Furthermore, it can be seen from FIG. 7 that each VAMOS channel 710, 720 has a separate control channel SACCH/FS, 715 and 725, respectively. In a similar manner to the single channel case shown in FIG. 2, these control channels 715 and 725 are transmitted in TDMA frame number 12. By consequence, the SACCH/FS for the two VAMOS channels 710 and 720 are transmitted synchronously.

In the context of VAMOS, the interference situation experienced by a mobile station (MS) is different from the operation where only one point-to-point connection is transmitted within one time slot. As already outlined above, in the operation with "one point-to-point connection" the interfering signals on traffic channels (TCH) used for speech traffic are typically GMSK modulated. In case of VAMOS operation, the interference experienced by a MS is a mix of GMSK and QAM signals, due to the fact that typically VAMOS operation and the operation with "one point-to-point connection" is mixed within the cell of a cellular network. Furthermore, QAM modulation is typically used on the downlink only. Thus, interference cancellation techniques in MS receivers which are optimized for GMSK modulated interference signals will typically not deliver the same performance improvements as in the case of purely GMSK modulated interferers. In particular, it may be assumed that the interference cancellation capability of a VAMOS capable MS is already used to suppress the other VAMOS channel which is transmitted within the same time slot. Consequently, these interference cancellation capabilities are not available for the cancellation of other interferers.

The situation is similar in the upstream direction, where a base station (BTS) receives overlapping VAMOS channels 710 and 720 from several mobile stations (MS). These VAMOS channels 710 and 720 differ from each other only in the training sequence code (TSC) and the base station requires improved interference cancellation capabilities in order to separate the overlapping VAMOS channels.

The interference cancellation capabilities are typically implemented as equalizers within the mobile stations, base stations or both. Such equalizers may comprise FIR (finite impulse response) filters which model the current transfer function of the radio transmission path. The filter coefficients may be determined using error minimization schemes, such as the minimization of a least square error. For this purpose a constant modulus algorithm may be employed. By consequence, the increased interference level during VAMOS operation may require increased memory and processing power at the base stations, mobile stations or both.

During DTX, the TCH part of at least one of the two VAMOS channels is inactive. Thus, the performance situation for the MS using the other VAMOS channel is typically improved since nothing is transmitted on the first channel. If in the remaining interferer scenario the strongest interferer is GMSK modulated an additional performance gain can be expected since the interference cancellation capability of the MS can now be utilized to suppress this external interferer. This also applies to the uplink direction. In other words, during DTX operation, one of the two VAMOS channels, e.g. channel 710, does not transmit speech blocks. This means that the traffic channels of the active VAMOS channel, i.e. channel 720, are not disturbed by the other VAMOS channel 710.

This does not, however, apply to the control channel, i.e. to the SACCH/FS 725. For the TDMA frames carrying SACCH, the DTX mode does not provide any benefit. As already highlighted above, the SACCH is never turned off, even if nothing is transmitted on the corresponding TCH. Thus, the interference situation during TDMA frames used for SACCH remains unchanged. In the above example, the SACCH 715 of the VAMOS channel 710 is also transmitted during DTX mode and interferes with the SACCH 725 of the VAMOS channel 720.

Considering that the link level performance for the TCH improves during DTX mode but remains unchanged for SACCH, this results in a performance imbalance between TCH and SACCH. A user will typically experience an improved voice quality, however, the control channel would still be submitted to deteriorations.

As a consequence, connections might be terminated by the MS due to control channel failures ("call drop") although the link quality of the traffic channel would still be sufficiently high to provide speech service with reasonable quality. In other words, a high number of deteriorated control channel blocks would eventually lead to the decision that the link level performance is unacceptable, even tough the transmitted voice channel still exhibits are reasonable link level performance. As outlined in the present document, this imbalance between the traffic channel and the control channel during DTX operation is caused by the interference of the control channels 715, 725 of the two VAMOS channels 710, 720 and the non-interference of the traffic channels of the two VAMOS channels 710, 720.

In order to improve the overall performance of radio communication systems using VAMOS, it would be beneficial to re-establish the balance between interference incurred by the traffic channel and the control channel of a point-to-point connection. In particular, it would be desirable to ensure that the link level performance of the control channel of a speech connection corresponds to the link level performance of the traffic channel of that speech connection. As outlined above, a situation where the link level performance of a traffic channel is better than the performance of the associated control channel may lead to a drop of the call even though it is of reasonable speech quality. On the other hand, a situation where the link level performance of a traffic channel is lower than the performance of the associated control channel may lead to an unacceptable user experience with a speech connection having an unacceptable speech quality. Therefore, a balance between the link level performance of the traffic channel and the associated control level should be established.

Such a balance during DTX operation of at least one of the VAMOS channels may be achieved by ensuring that the control channels of the two VAMOS channels do not overlap. In particular, it may be achieved by mapping the SACCH for full rate and half rate VAMOS channels as illustrated in FIGS. 8a, 8b and 9a, 9b, respectively.

Figure 8B:
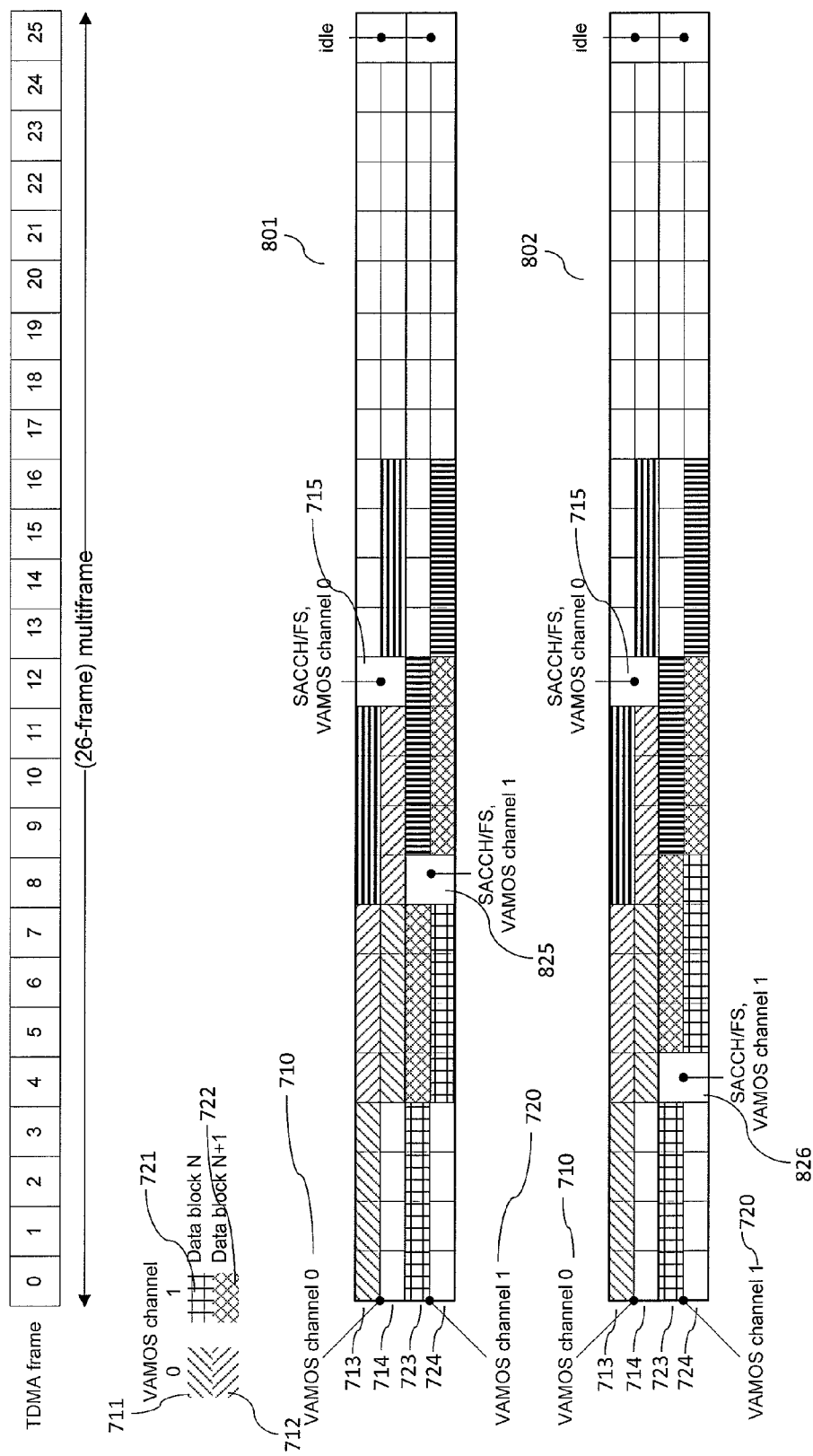

FIG. 8a illustrates two VAMOS channels 710 and 720 using respective control channels 715 and 725 which are overlapping, i.e. which are sharing the same TDMA frame. This situation corresponds to the situation of FIG. 7. The reference signs of FIG. 7 are used in FIG. 8 to indicate the corresponding entities. FIG. 8b illustrates two variants, where the control channels of the two VAMOS channels are offset with respect to one another.

The upper multiframe 801 shows a situation, where the control channel 825 of the VAMOS channel 720 is placed four TDMA frames before the control channel 715 of the VAMOS channel 710. Consequently, the control channels of both VAMOS channels 710 and 720 have an offset of four TDMA frames. The lower multiframe 802 illustrates and offset of eight TDMA frames. It can be seen that the control channel 826 of the VAMOS channel 720 is positioned eight TDMA frames prior to the control channel 715 of the VAMOS channel 710.

In other words, the location of the SACCH is changed by either 4 (in case of multiframe 801) or 8 (in case of multiframe 802) TDMA frames. Both options have similar performance benefits with regards to the balancing of interference during DTX operation. It should be noted that the proposed mappings may be used for the uplink and downlink direction.

Since the SACCH frames of the VAMOS channels do not overlap in these mappings, the benefits of interference reduction during DTX operation apply also for the SACCH and not only for the TCHs, i.e. if the traffic channel on one VAMOS channel is in DTX, the interference for both, the TCH and the SACCH of the other VAMOS channel is reduced simultaneously. Thus, performance between control and traffic channels remains balanced.

Figure 9B:
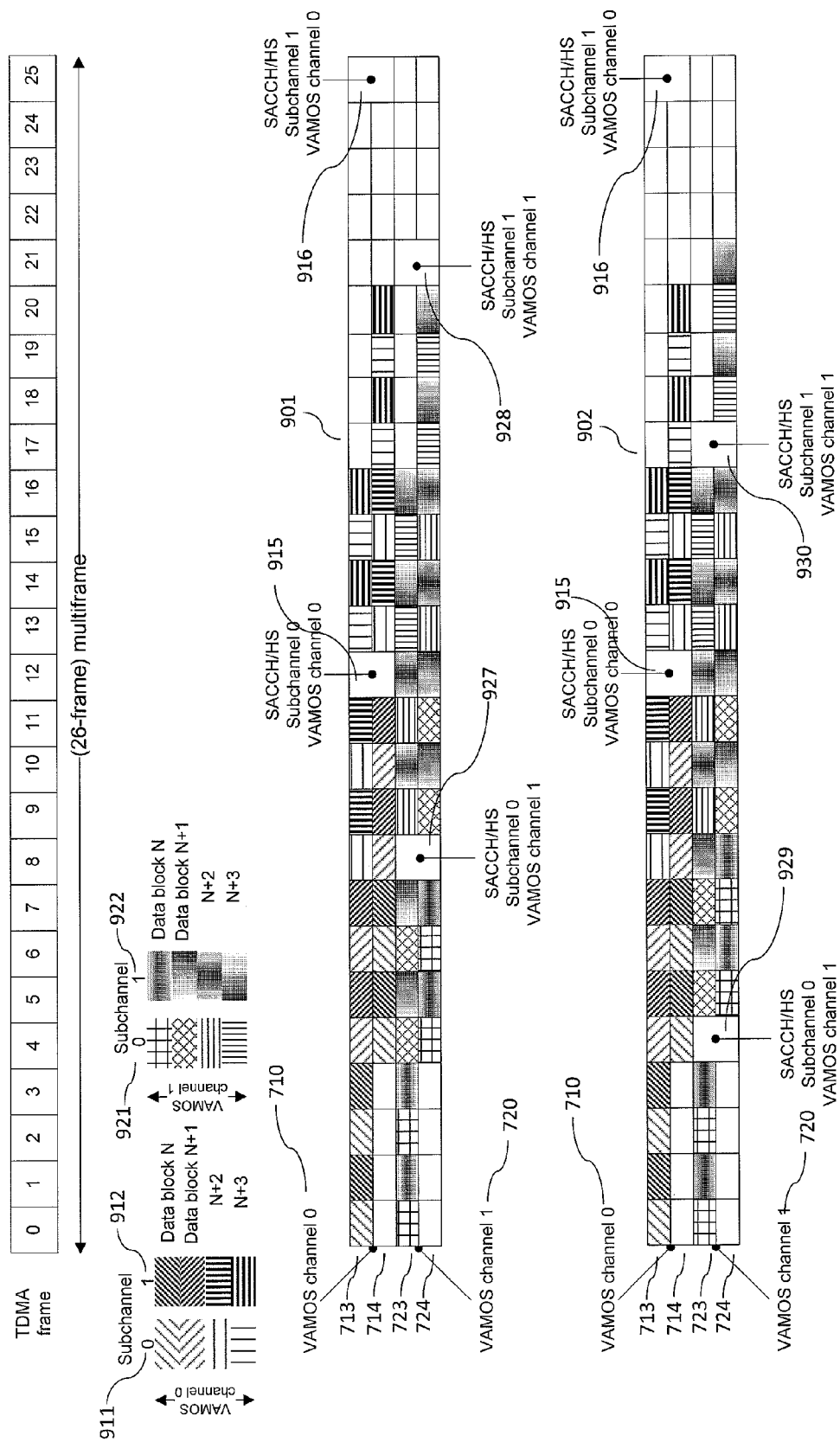

FIGS. 9a and 9b illustrate the removal of SACCH overlap in the case of half rate channels. FIG. 9b shows two VAMOS channels 710 and 720 which are both operated at half rate, i.e. both VAMOS channels 710 and 720 have a first and a second subchannel. The different speech blocks of the different subchannels are represented by differently shaded boxes. The four speech blocks N, N+1, N+2 and N+3 transmitted in the subchannel 0 of VAMOS channel 710 are represented by the four shadings shown in the list 911. The four speech blocks N, N+1, N+2 and N+3 transmitted in the subchannel 1 of VAMOS channel 710 are represented by the four shadings shown in the list 912. The four speech blocks N, N+1, N+2 and N+3 transmitted in the sub-channel 0 of VAMOS channel 720 are represented by the four shadings shown in the list 921. The four speech blocks N, N+1, N+2 and N+3 transmitted in the subchannel 1 of VAMOS channel 720 are represented by the four shadings shown in the list 922.

It can be seen that the control channel 915 of subchannel 0 of VAMOS channel 710 shares the same TDMA frame as the control channel 925 of sub-channel 0 of VAMOS channel 720. Furthermore, the control channel 916 of subchannel 1 of VAMOS channel 710 shares the same TDMA frame as the control channel 926 of subchannel 1 of VAMOS channel 720. During DTX operation this overlap of control channels typically leads to an imbalance of the link performance incurred by the traffic channel and the control channel of a VAMOS channel.

In order to avoid such imbalance, the re-positioning or alternative mapping of control channels shown in FIG. 9b may be applied. The upper multiframe 901 shows a situation, where the control channel 927 of subchannel 0 of the VAMOS channel 720 is placed four TDMA frames before the control channel 915 of subchannel 0 the VAMOS channel 710. Also, the control channel 928 of subchannel 1 of the VAMOS channel 720 is placed four TDMA frames before the control channel 916 of subchannel 1 of the VAMOS channel 710. Consequently the control channels of both VAMOS channels 710 and 720 have an offset of four TDMA frames. The lower multiframe 902 illustrates an offset of eight TDMA frames. It can be seen that the control channel 929 of subchannel 0 of VAMOS channel 720 is positioned eight TDMA frames prior to the control channel 715 of subchannel 0 of the VAMOS channel 710. Also, the control channel 930 of subchannel 1 of the VAMOS channel 720 is placed eight TDMA frames before the control channel 916 of subchannel 1 of the VAMOS channel 710.

In an example embodiment, the mapping of the logical channels onto the physical channels in uplink and downlink for the first VAMOS channel may be done as defined for the corresponding TCH channels in subclauses 6.2 and 6.3 of 3GPP TS 45.002. For the second VAMOS channel the mapping of the logical channels onto physical channels in uplink and downlink may be done outlined below. In downlink if two corresponding VAMOS channels have bursts scheduled for transmission on a given timeslot in a given TDMA frame and on a given ARFCN, then the bits from the two corresponding VAMOS channels may be mapped on to AQPSK symbols (see subclause 5.2.3 of 3GPP TS 45.002).

The mapping from TDMA frame number (FN) to radio frequency channel (RFCH) may be done as specified in subclause 6.2 of 3GPP TS 45.002.

FIG. 9c illustrates a possible mapping of logical channels onto physical channels for the second VAMOS channel. The columns of the table shown in FIG. 9c describe the following:

i) "Channel designation" gives the precise acronym for the channel to which the mapping applies.

ii) "Subchannel number" identifies the particular subchannel being defined where a basic physical channel supports more than one channel of this type.

iii) "Direction" defines whether the mapping given applies identically to downlink and uplink (D&U), or to downlink (D) or uplink (U) only.

iv) "Allowable timeslots assignments" defines whether the channel can be supported on, or assigned to, any of the timeslots, or only on specific timeslots.

v) "Allowable RF channel assignments" defines whether the channel can use any or all of the radio frequency channels in the cell allocation (CA), or only the BCCH (Broadcast Control Channel) carrier (C0). It should be noted that any allocated channel Cx within CA could be any radio frequency channel, and that no ordering of radio frequency channel number is implied. For example, allocated channel C0 need not have the lowest radio frequency channel number of the allocation.

vi) "Burst type" defines which type of burst as defined in clause 5.2 of 3GPP TS 45.002 is to be used for the physical channel.

vii) "Repeat length in TDMA frames" defines how many TDMA frames occur before the mapping for the interleaved blocks repeats itself e.g. 51.

viii) "Interleaved block TDMA frame mapping" defines, within the parentheses, the TDMA frames used by each interleaved block (e.g. 0 . . . 3). The numbers given equate to the TDMA frame number (FN) modulo the number of TDMA frames per repeat length; Therefore, the frame is utilized when: TDMA frame mapping number=(FN) mod repeat length given.

Figure 9D:
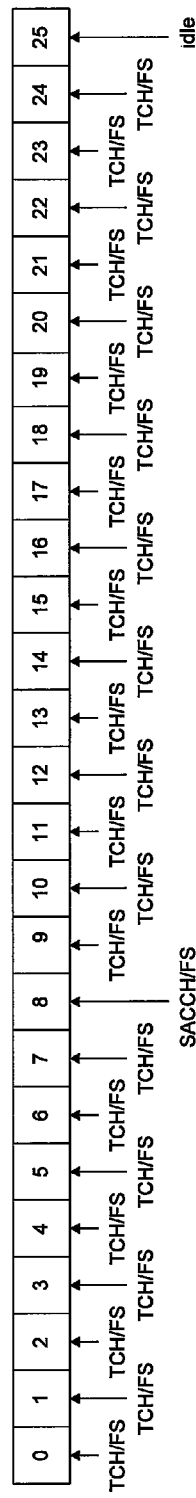
FIG. 9d illustrates an example TDMA frame mapping for TCH/FS on the second VAMOS channel.
Figure 9E:
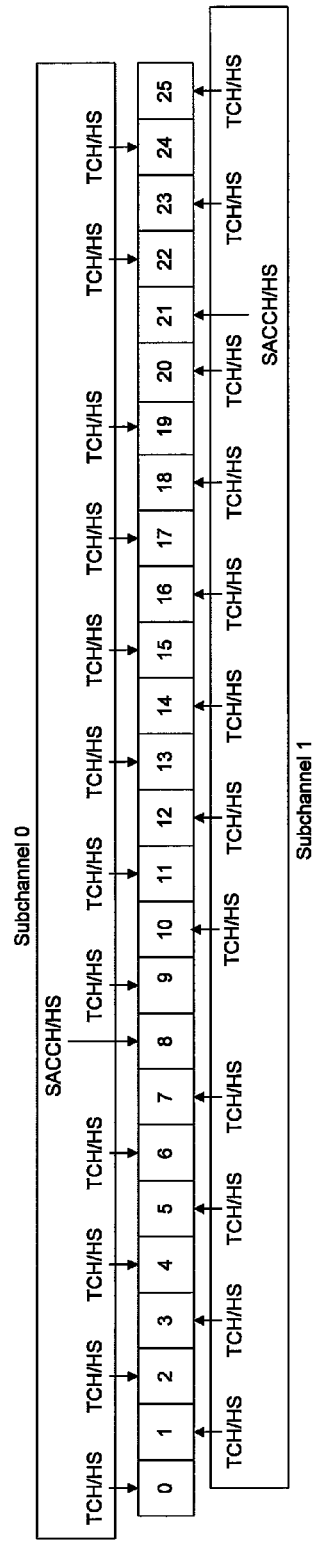
FIG. 9e illustrates an example TDMA frame mapping for TCH/HS+SACCH/HS subchannels 0 and 1 on the second VAMOS channel.

The relationship of the air interface frames to the multiframe for the first VAMOS channel are defined in clause 7 3GPP TS 45.002. FIGS. 9d and 9e define the relationship of the air interface frames to the multiframe for the second VAMOS channel.

As a side note, it is pointed out that in the context of the 3GPP TSG GERAN, the first VAMOS channel may also be referred to as VAMOS subchannel 0 or VAMOS channel 0 and the second VAMOS channel may be referred to as VAMOS subchannel 1 or VAMOS channel 1. In case of half rate channels, VAMOS subchannel 0 would be subdivided itself into subchannel 0 and subchannel 1. In a similar manner, VAMOS subchannel 1 would be itself subdivided into subchannel 0 and subchannel 1.

It should be noted that the mapping outlined in the context of FIGS. 8 and 9 is also applicable in the case that one VAMOS channel, e.g. VAMOS channel 710, is configured to carry TCH/FS and the other VAMOS channel, e.g. VAMOS channel 720, to carry TCH/HS. The resulting mapping is a mapping as shown in FIG. 8a for the full rate VAMOS channel 710 and one of the mappings of multiframe 901 or 902 of FIG. 9b for VAMOS channel 720. Also the vice versa situation is possible.

It should be noted that in the proposed mapping or re-positioning of the control channel, the multiframe structure remains unchanged. In other words, the TCH and SACCH frames of a certain multiframe stay within a given multiframe. This means that the original mapping is not shifted as a whole, i.e. no TCH or SACCH frame is moved from one (26-frame) multiframe to the next one. The TCHs are just re-arranged in a (26-frame) multiframe so as to accommodate for different positions of the SACCH frames. This is beneficial as no additional delay in the transmission of speech traffic is incurred. Furthermore, by maintaining the underlying multi-frame structure of GERAN, the channel and/or carrier and/or frequency management in a GERAN base station can be maintained. By consequence, this reduces computational complexity and allows for a simplified upgrade of already installed base station equipment.

Furthermore, it should be noted that the proposed mapping of control channels or SACCHs maintains the delay properties of currently used GERAN traffic channels. As has been outlined in the context of FIG. 4 a speech block is transmitted within 8 successive TDMA frames. As such, the time for transmitting a speech block typically corresponds to 8 TDMA frames. In other words, the distance between the first frame and the last frame of a speech block is 7. However, frame number 12 of a multiframe carries the control channel 407. By consequence, speech blocks which use the four TDMA frames prior to frame 407 and the four TDMA frames after frame 407 require a time corresponding to 9 TDMA frames for transmission. In other words, the distance between the first frame and the last frame of a speech block is 8.

This distance or time relation can be maintained when using the re-positioning or mapping of VAMOS control channels as illustrated in FIG. 8b. In other words, the distances from the first to the last TDMA frame carrying data from a given speech frame are the same as in the original mapping, 7 for TCH/FS and 8 if the TDMA frame reserved for SACCH is positioned between the first and second half of the data block.

As can be seen in FIG. 5, this also applies for half rate channels. The distance from the first to the last TDMA frame carrying data from a given speech frame is 6 for TCH/HS and 7 if the TDMA frame reserved for SACCH is positioned between the first and second half of the data block. As can be seen from FIG. 9b, this relation also applies for the control channel/SACCH mapping described in the present document.

Overall, it may therefore be stated that the proposed control channel mapping maintains the delay properties of the currently used GSM control channel mapping. In particular, the variance or variation, i.e. the relation between maximum and minimum delay, as well as the maximum delay is kept unchanged. As a consequence, the proposed mapping does not require any additional buffering means at the base station, the mobile stations or both. As a matter of fact, it allows the use of the already available buffering means.

It should be noted that the above situation changes, if other offsets which are different from minus four or minus eight are used. By way of example, it may be assumed in the half rate scenario of FIG. 9a that the control channel 925 of the VAMOS channel 720 is offset by minus six with respect of the control channel 915 of VAMOS channel 710. Furthermore, the control channel 926 of the VAMOS channel 720 may be offset by minus seven with respect of the control channel 916 of VAMOS channel 710. As can then be seen, such mapping for half rate channels would result in a larger variation of the distance from the first to the last TDMA frame carrying data from a given speech frame. For the above example, the possible distances would be 5, 6 and 8 frames, i.e. both the variance and the maximum delay would have been increased compared to the situation which uses the original control channel mapping. This results in a higher complexity for scheduling when to transmit or receive data. By consequence, it can be stated that the offsets proposed in FIG. 9b provide low maximum delay and low variance, i.e. low complexity for scheduling at the transmitter and/or receiver.

Furthermore, such arbitrary mapping schemes may result in situations where data is transmitted in adjacent TDMA frames. In the above example, the two TCH frames with Frame Number 12 and 13 of subchannel 0 of VAMOS channel 720 would be adjacent and would not be interleaved by a TDMA frame assigned to the other subchannel 1. The same would be the case for TCH frames with Frame Numbers 24 and 26 of subchannel 1 of VAMOS channel 720. The presence of adjacent subchannel frames typically reduces diversity gain and may lead to decreased link quality, i.e. to a higher error rate. By consequence, it can be stated that the offsets proposed in FIG. 9b provide high diversity gain and high link quality.

The above shortcomings with regards to an increased delay variance, an increased maximum delay and/or adjacent transmitted TDMA frames can be removed when using the minus four or minus eight offsets for the control channels, as outlined in the context of FIGS. 8 and 9.

A further aspect to be considered when mapping the control channels of a VAMOS channel is the transmission of SID frames during DTX operation of at least one of the two VAMOS channels. As outlined above and as shown in Table 1, FR, HR or EHR codecs use specific TDMA frames for the transmission of SID frames. It may be desirable to maintain the frame numbers listed in Table 1 for SID transmission. As can be seen from FIGS. 8b and 9b, the SACCH mapping proposed for the multiframes 801 and 901, respectively, do not interfere with the SID frame numbers defined in Table 1. In other words, when offsetting the control channel of one VAMOS channel by minus four TDMA frames, the currently specified frames for SID transmission may be maintained or reused, since the new SACCH mapping does not coincide with the mapping of the SID frames specified in Table 1.

On the other hand, the mappings described for multiframes 802 and 902 in FIGS. 8b and 9b would require a new mapping for the SID frames. When defining this mapping, care should be taken that the SID frame mapping does not overlap with the SACCH frames of the other VAMOS channel since this would re-establish the link level performance imbalance outlined above. In other words, it should be ensured that SID frames of one VAMOS channel are not transmitted within the same TDMA frame as a SACCH frame of the other VAMOS channel. Yet, in other words, it should be ensured that the interference for SACCH frames does not change even if the other VAMOS channel is in DTX mode.

A further aspect to consider is the appropriate pairing of mobile stations. I.e. a base station can be enabled to select appropriate mobile stations which share a common time slot. The concept of VAMOS implies that two users are multiplexed on the same time slot. Typically it has been assumed that once a pair of mobile stations has been selected by the base station, this pairing remains in effect until one of the corresponding connections is terminated. Such assumption may be valid if two full rate traffic channels are used as shown in FIG. 10. It can be seen that the pairing 1011 of the two traffic channels or users T, T' in the multiframe 1010 remains unchanged. As a consequence, also the interference situation between both VAMOS channels remains unchanged.

However, in case of a half rate configuration in either one or both VAMOS channels, the pairing of users may change. With the proposed SACCH position for HR channels in FIG. 9b, the pairing of traffic channels changes after every TDMA frame used for SACCH. The user on VAMOS channel 0 is thus paired with two users in turn. This affects the scheduling algorithm in the base station. The base station now would need to select not only a pair of suitable connections to be transmitted on VAMOS channel 0 and 1, respectively, during a time slot, but up to a quadruple of connections in case of 4 HR channels on the two VAMOS channels.

This can be seen in FIG. 10 and multiframes 1020, 1030, 1040 and 1050, where at least one of the VAMOS channels works at half rate. FIG. 10 illustrates the case where the control channel of the second VAMOS channel is offset by minus four TDMA frames with respect to the control channel of the first VAMOS channel. It can be seen that after every SACCH occurrence the pairing between the TCHs or users changes, due to the fact that the SACCH of the second VAMOS channel is transmitted at an offset position.

In particular it can be seen that when using one full rate TCH in the first VAMOS channel and two half rate TCHs in the second VAMOS channel as shown in multiframe 1020, two pairings have to be considered, i.e. (T, T') indicated by reference sign 1021 and (T, t') indicated by reference sign 1022. When using two half rate TCHs in the first VAMOS channel and one half rate TCH (subchannel 1) in the second VAMOS channel as shown in multiframe 1030, also two pairings have to be considered, i.e. (t, t') indicated by reference sign 1031 and (T, t') indicated by reference sign 1032. When using two half rate TCHs in the first VAMOS channel and one half rate TCH (subchannel 0) in the second VAMOS channel as shown in multiframe 1040, also two pairings have to be considered, i.e. (T, T') indicated by reference sign 1041 and (t, T') indicated by reference sign 1042. Finally, when using two half rate TCHs in the first VAMOS channel and two half rate TCHs in the second VAMOS channel as shown in multiframe 1050, four pairings have to be considered, i.e. (T, T') indicated by reference sign 1051, (t, t') indicated by reference sign 1052, (t, T') indicated by reference sign 1053 and (T, t') indicated by reference sign 1054.

In general, it can be stated that as a consequence of offsetting the control channels, a traffic channel in one VAMOS channel interferes with both half rate traffic channels of the other VAMOS channels. This means that a mobile station which is assigned to a first VAMOS channel has to be paired with two mobile stations working at half rate, which are assigned to the second VAMOS channel.

Thus, the base station would need to find not only two matching connections or mobile stations and to combine them to a pair which will typically remain unchanged until an explicit channel reconfiguration is signaled or one of the connections is terminated. In case of re-mapping or offsetting of the VAMOS control channels the base station would have to find three matching connections or mobile stations which are paired in two pairs, e.g. (t, t') and (T, t') of multiframe 1030, or four matching connections which are paired in all four possible combinations, (T, T'), (t, t'), (t, T'), (T, t') of multiframe 1050.

In other words, the base station would need to identify three or four mobile stations that would be paired in certain combinations. In case of the situation of multiframe 1030 the mobile station associated with the half rate channel T would need to be paired with the mobile station associated with the half rate channel t'. The latter mobile station would also need to be paired with the mobile station associated with the half rate channel t. Such pairing is beneficial, in order to reduce the overall interference between the traffic channels which are transmitted in the same time slot and within the same TDMA frame. The base station can therefore select a set of mobile stations for the communication over corresponding VAMOS channels which minimizes the overall interference or which balances the interference between the different communications.

Another aspect to consider is an appropriate interference balance between the different mobile stations. Each mobile station should only be submitted to a degree of interference which it can handle. This means that mobile stations with improved interference cancellation properties could be submitted to a higher degree of interference than mobile stations with lower interference cancellation properties. Overall, it should be ensured that a connection between a base station and a mobile station from a set of mobile stations, wherein the mobile stations are assigned to associated VAMOS channels, generates a degree of interference which can be handled by the respective other mobile stations of the set.

In the case where four half rate channels would be multiplexed onto a time slot of a multiframe, four mobile stations would need to be selected. One method for the base station to select the best fitting quadruple of connections could be to rank all potential connections according to the required transmitter output power level, both in uplink and downlink direction. Based on this ranking, groups of four connections each could be built. Preferably, the selection can also take into account the receiver capabilities of the respective terminals or mobile stations. A strategy for the case where all terminals have equal receiver performance could be to select consecutive groups of four connections and pair them accordingly. If, on the other hand terminals with advanced receiver capabilities are involved, i.e. terminals which can handle more severe interference scenarios, groups which would result in higher interference for these advanced terminals could be selected, based on the initial ranking of power levels.

A further aspect to be considered is the reporting period. During SACCH frames the mobile station (MS) typically sends, amongst others, measurement reports about the link quality to the base station. The reporting period and the TDMA frames during which to send the reports are specified in 3GPP TS 45.008 section 8.4.1, which is incorporated by reference. Table 2 provides the reporting period and TDMA frame mapping for measurement reports.

TABLE 2

| Timeslot number (TN) | | | TDMA frame number (FN) modulo 104 | |
| --- | --- | --- | --- | --- |
| Full Rate | Half rate, subch.0 | Half rate, subch.1 | Reporting period | SACCH Message block |
| 0 | 0 and 1 | | 0 to 103 | 12, 38, 64, 90 |
| 1 | | 0 and 1 | 13 to 12 | 25, 51, 77, 103 |
| 2 | 2 and 3 | | 26 to 25 | 38, 64, 90, 12 |
| 3 | | 2 and 3 | 39 to 38 | 51, 77, 103, 25 |
| 4 | 4 and 5 | | 52 to 51 | 64, 90, 12, 38 |
| 5 | | 4 and 5 | 65 to 64 | 77, 103, 25, 51 |
| 6 | 6 and 7 | | 78 to 77 | 90, 12, 38, 64 |
| 7 | | 6 and 7 | 91 to 90 | 103, 25, 51, 77 |

In case of a new SACCH mapping for VAMOS, an additional table specifying the reporting period and position of the SACCH message blocks would be required. Depending on the chosen SACCH mapping, the position of the SACCH message blocks in Table 2 would have to be offset by 4 or 8 frames, respectively. The reporting period could remain unchanged or, alternatively, the same offset as for the SACCH message block position could be applied.

Figure 11:
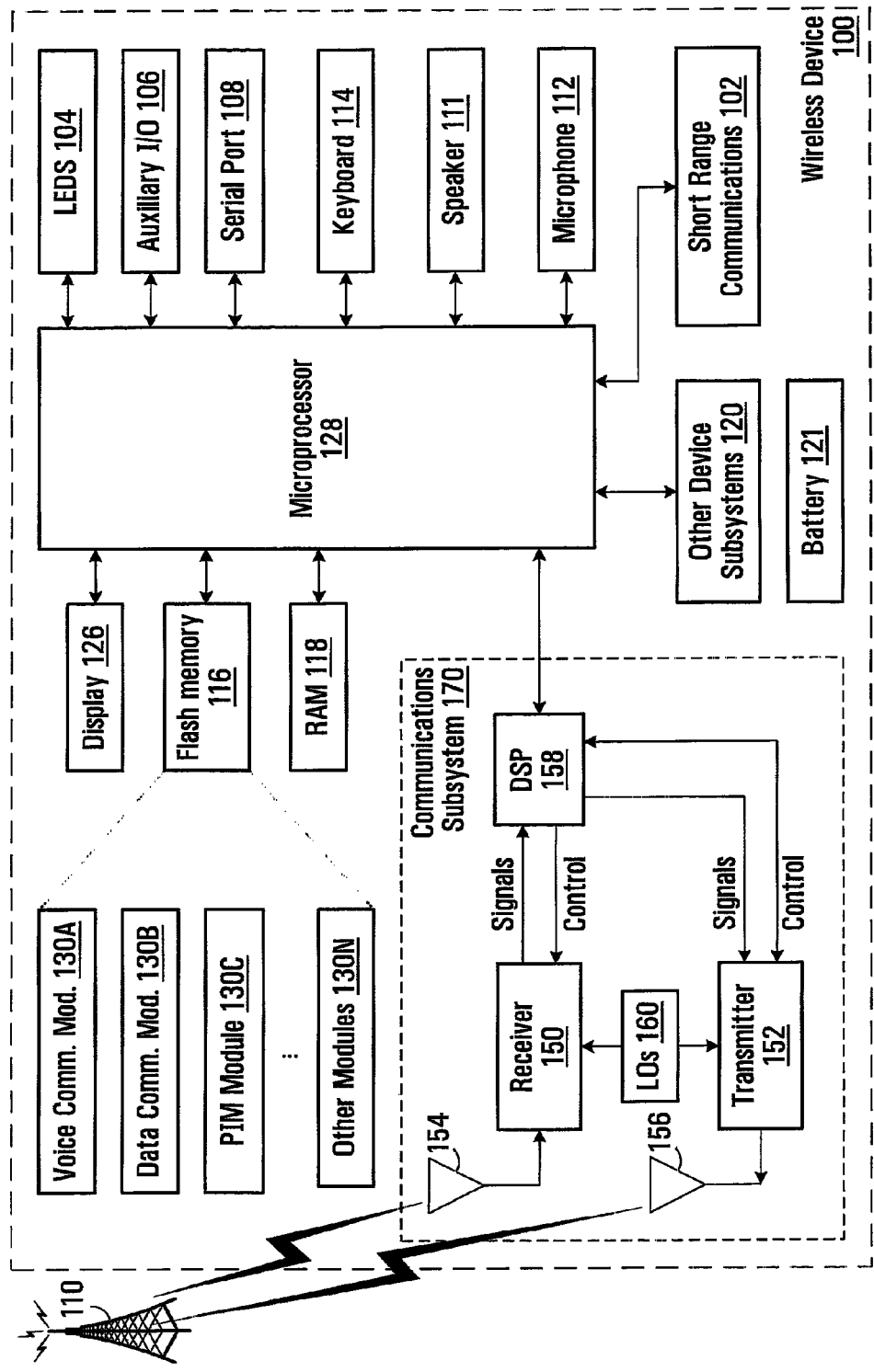
FIG. 11 is a block diagram of an example implementation of a mobile station.

Referring now to FIG. 11, shown is a block diagram of a mobile station, user equipment or wireless device 100 that may, for example, implement any of the methods described in this disclosure. It is to be understood that the wireless device 100 is shown with very specific details for example purposes only. A processing device (a microprocessor 128) is shown schematically as coupled between a keyboard 114 and a display 126. The microprocessor 128 controls operation of the display 126, as well as overall operation of the wireless device 100, in response to actuation of keys on the keyboard 114 by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A pre-determined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 includes functionality for implementing one or more of the embodiments described above in detail. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™, GERAN or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1x and 1x EV-DO. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GERAN or GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

In some implementations, the wireless device 100 is capable of operating in multiple modes such that it can engage in both CS (Circuit-Switched) as well as PS (Packet-Switched) communications, and can transition from one mode of communications to another mode of communications without loss of continuity. Other implementations are possible.

In a particular embodiment, one or more of the above-described methods for communicating with a corresponding base station 110 are implemented by the communications subsystem 170, the microprocessor 128, the RAM 118, and the data communications module 130B, collectively appropriately configured to implement one of the methods described herein.

Figure 12:
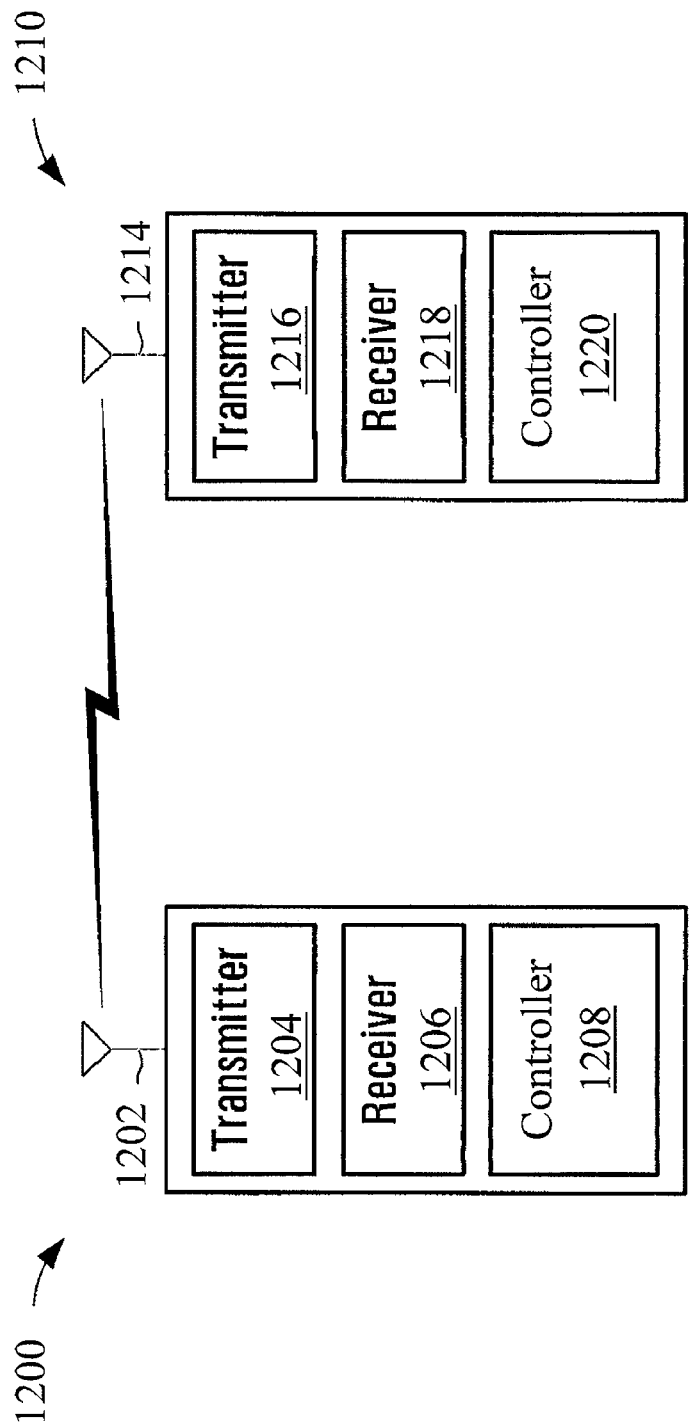
FIG. 12 is a block diagram of an example network comprising a mobile station and a base station.

FIG. 12 is a block diagram of a system within which one or more of the embodiments described above may be implemented. There is a mobile station 1200 in wireless communication with a network, as represented by network device or base station 1210. As outlined in the context of FIG. 11, the mobile station 1200 has at least one antenna 1202, a transmitter 1202 and a receiver 1204 (which may be implemented together as a transceiver) and a controller 1208. The network device or base station 1210 has at least one antenna 1214, a transmitter 1216 and a receiver 1218 (which may be implemented together as a transceiver) and a controller 1220. The controllers 1208, 1220 may be implemented in hardware, or a combination of software and hardware, for example software running on a processor.

In the present document, a mapping scheme for the control channels of associated VAMOS channels has been proposed. This mapping scheme establishes the balance between the interference incurred during DTX operation of at least one VAMOS channel on the control channel and the traffic channel of the other VAMOS channel. By this means, improved user experience, lower call drop rates or both can be achieved. Furthermore, by using the proposed mapping, the delay properties of the conventional mapping scheme can be maintained. In addition, a pairing scheme which is executed at the base station has been outlined. Such pairing scheme allows a base station to identify a group of mobile stations which may be multiplexed most efficiently onto the VAMOS channels.

The method and system described in the present document may be implemented as software, firmware and/or hardware. Certain components may e.g. be implemented as software running on a digital signal processor or microprocessor. Other components may e.g. be implemented as hardware or as application specific integrated circuits. The signals encountered in the described methods and systems may be stored on media such as random access memory or optical storage media. They may be transferred via networks, such as radio networks, satellite networks or wireless networks. Typical devices making use of the method and system described in the present document are mobile stations such as mobile telephones or smartphones. On the network side, the method and system may be used in base station equipment.

ABBREVIATIONS

In the following, abbreviations used in the present document are listed:

| | |
|---|---|
| 3GPP | Third Generation Partnership Project |
| AMR | Adaptive Multi Rate |
| DTX | Discontinuous Transmission |
| EDGE | Enhanced Data rates for GSM Evolution |
| EFR | Enhanced Full Rate |
| FDD | Frequency Division Duplex |
| FN | Frame Number |
| FR | Full Rate |
| GERAN | GSM EDGE Radio Access Network |
| GMSK | Gaussian Minimum Shift Keying |
| GSM | Global System for Mobile communications |
| HR | Half Rate |
| MS | Mobile Station |
| NB | Normal Burst |
| SACCH | Slow Associated Control Channel |
| SACCH/FS | SACCH associated with a full rate speech traffic channel |
| SACCH/HS | SACCH associated with a half rate speech traffic channel |
| SID | Silence Descriptor |
| TCH | Traffic Channel |
| TCH/FS | Traffic channel for full rate speech |
| TCH/HS | Traffic channel for half rate speech |
| TDMA | Time-Division Multiple Access |
| TSC | Training Sequence Code |
| TSG | Technical Specification Group |
| VAD | Voice Activity Detection |
| VAMOS | Voice services over Adaptive Multi-user channels on One Slot |

The invention claimed is:

1. A GERAN base station, comprising a transceiver which is operable to
   communicate with a first mobile station via a first VAMOS channel;
   communicate with a second mobile station via a first subchannel of a second corresponding VAMOS channel; and
   use a control channel of the second VAMOS channel which is offset by 4 or 8 TDMA frames with respect to a control channel of the first VAMOS channel, wherein the second VAMOS channel is operated at half rate and wherein the transceiver is operable to:
   communicate with a third mobile station via a second subchannel of the second VAMOS channel, and
   select the first, second and third mobile station by evaluating interference between (a) the first VAMOS channel and the first subchannel of the second VAMOS channel and (b) the first VAMOS channel and the second subchannel of the second VAMOS channel.

2. The base station of claim 1, wherein the first and second VAMOS channel share a common time slot within a TDMA frame.

3. The base station of claim 2, wherein the first and second VAMOS channel use a different training sequence code within the common time slot.

4. The base station of claim 1, wherein a signal constellation used by the first VAMOS channel is orthogonal to a signal constellation used by the second VAMOS channel.

5. The base station of claim 1, wherein the control channels are SACCH.

6. The base station of claim 1, wherein
   the control channel of the first VAMOS channel is transmitted at TDMA frame number 12 of a multiframe; and
   the control channel of the second VAMOS channel is transmitted at TDMA frame number 4 or 8 of a multiframe.

7. The base station of claim 6, wherein
the control channel of the second VAMOS channel is transmitted at TDMA frame number 8 of a multiframe.

8. The base station of claim 1, wherein
a further control channel of the first VAMOS channel is transmitted at TDMA frame number 25 of a multiframe; and
a further control channel of the second VAMOS channel is transmitted at TDMA frame number 17 or 21 of a multiframe.

9. The base station of claim 8, wherein
the further control channel of the second VAMOS channel is transmitted at TDMA frame number 21 of a multiframe.

10. The base station of claim 1, wherein
the first VAMOS channel is a full rate or a half rate channel; and/or
the second VAMOS channel is a full rate or a half rate channel.

11. The base station of claim 1, wherein the first and second VAMOS channels use one of: half rate, full rate, enhanced full rate, adaptive multi-rate speech encoding.

12. The base station of claim 1, wherein the time for transmitting a speech block is
smaller or equal to eight TDMA frames; and
greater or equal to six TDMA frames.

13. The base station of claim 1, wherein the variance of the time for the transmission of a speech block measured in number of TDMA frames is the same for the first and second VAMOS channel.

14. The base station of claim 1, wherein the first and/or the second VAMOS channel are operable to perform discontinuous transmission.

15. The base station of claim 14, wherein:
during discontinuous transmission at least one silence descriptor frame is transmitted on the VAMOS channel which performs discontinuous transmission; and
the at least one silence descriptor frame does not coincide with the control channel of the other VAMOS channel.

16. The base station of claim 1, wherein the base station is operable to select a first and a second mobile station for communication over the first and second VAMOS channel, such that a link performance of the first and the second VAMOS channel is maximized.

17. The base station of claim 1, wherein the base station is operable to select a first and a second mobile station for communication over the first and second VAMOS channel, such that a link performance of the first and the second VAMOS channel exceeds a pre-determined threshold value.

18. The base station of claim 1, wherein the transceiver is operable to select the first, second and third mobile station, such that a link performance of the first VAMOS channel, and the first and second subchannel of the second VAMOS channel exceeds a pre-determined threshold value.

19. The base station of claim 1, wherein
the first VAMOS channel is operated at half rate and comprises a first and a second subchannel; and
for the first and the second VAMOS channel, two TDMA frames of the first or second subchannel are never directly adjacent.

20. The base station of claim 1, wherein a reporting period of the first VAMOS channel corresponds to a reporting period of the second VAMOS channel.

21. The base station of claim 1, wherein
a reporting period of the first VAMOS channel is offset to a reporting period of the second VAMOS channel; and
the offset of the reporting period corresponds to the offset of the control channels.

22. A GERAN compatible mobile station comprising a transceiver which is operable to
communicate with a first mobile station via a first VAMOS channel; and
use a control channel of the first VAMOS channel which is offset by 4 or 8 TDMA frames with respect to a control channel of a corresponding second VAMOS channel, wherein the second VAMOS channel is operated at half rate and wherein the transceiver is operable to:
communicate with a second mobile station via a first subchannel of the second VAMOS channel,
communicate with a third mobile station via a second subchannel of the second VAMOS channel, and
select the first, second and third mobile station, such that a link performance of the first VAMOS channel, and the first and second subchannel of the second VAMOS channel exceeds a pre-determined threshold value.

23. The mobile station of claim 22, wherein:
the control channel of the first VAMOS channel is transmitted at TDMA frame number 12 of a multiframe; and
the control channel of the second VAMOS channel is transmitted at TDMA frame number 4 or 8 of a multiframe.

24. The mobile station of claim 22, wherein:
a further control channel of the first VAMOS channel is transmitted at TDMA frame number 25 of a multiframe; and
a further control channel of the second VAMOS channel is transmitted at TDMA frame number 17 or 21 of a multiframe.

25. A method for reducing interference of a first and a second VAMOS channel during DTX operation of at least one of the two VAMOS channels, the method comprising:
communicating with a first mobile station via the first VAMOS channel;
communicating with a second mobile station via a first subchannel of the second VAMOS channel; and
using a control channel in a multiframe of the first VAMOS channel which is offset by 4 or 8 TDMA frames with respect to the control channel in a multiframe of the second VAMOS channel, wherein the second VAMOS channel is operated at half rate and wherein a transceiver is operable to:
communicate with a third mobile station via a second subchannel of the second VAMOS channel, and
select the first, second and third mobile station, such that a link performance of the first VAMOS channel, and the first and second subchannel of the second VAMOS channel exceeds a pre-determined threshold value.

* * * * *

UNITED STATES PATENT AND TRADEMARK OFFICE
CERTIFICATE OF CORRECTION

| | |
|---|---|
| PATENT NO. | : 8,687,559 B2 |
| APPLICATION NO. | : 13/388930 |
| DATED | : April 1, 2014 |
| INVENTOR(S) | : Werner Kreuzer |

It is certified that error appears in the above-identified patent and that said Letters Patent is hereby corrected as shown below:

In the Claims:

Column 23, line 28 (Claim 13): after "time for", delete "the".

Signed and Sealed this
Second Day of December, 2014

Michelle K. Lee
*Deputy Director of the United States Patent and Trademark Office*